US 7,635,301 B2

(12) United States Patent
Ueshima

(10) Patent No.: US 7,635,301 B2
(45) Date of Patent: Dec. 22, 2009

(54) GAME SYSTEM

(75) Inventor: Hiromu Ueshima, Shiga (JP)

(73) Assignee: SSD Company Ltd., Shiga (JP)

(*) Notice: Subject to any disclaimer, the term of this patent is extended or adjusted under 35 U.S.C. 154(b) by 0 days.

(21) Appl. No.: 10/511,277

(22) PCT Filed: Apr. 16, 2003

(86) PCT No.: PCT/JP03/04861

§ 371 (c)(1),
(2), (4) Date: Oct. 21, 2004

(87) PCT Pub. No.: WO03/090888

PCT Pub. Date: Nov. 6, 2003

(65) Prior Publication Data
US 2005/0176485 A1 Aug. 11, 2005

(30) Foreign Application Priority Data
Apr. 24, 2002 (JP) ............................. 2002-122646

(51) Int. Cl.
A63F 13/02 (2006.01)
A63F 13/04 (2006.01)
A63F 13/06 (2006.01)
A63F 13/08 (2006.01)
A63F 13/12 (2006.01)
A63F 7/20 (2006.01)
A63F 7/22 (2006.01)
(52) U.S. Cl. .................... 463/3; 463/2; 463/4; 463/30; 463/31; 463/36; 463/39
(58) Field of Classification Search ................ 463/2–5, 463/7, 50, 202, 36–39, 30, 31; 473/198–200, 473/221–225, 459, 461
See application file for complete search history.

(56) References Cited

U.S. PATENT DOCUMENTS

| 4,545,576 | A | * | 10/1985 | Harris ........................ 473/468 |
| 5,269,519 | A | * | 12/1993 | Malone ....................... 473/154 |
| 5,667,220 | A | * | 9/1997 | Cheng ...................... 273/148 B |
| 5,741,182 | A | * | 4/1998 | Lipps et al. ................... 463/36 |
| 5,779,555 | A | * | 7/1998 | Nomura et al. ............. 473/223 |

(Continued)

FOREIGN PATENT DOCUMENTS

| JP | 2000-325660 A | 11/2000 |
| JP | 2001-149656 A | 6/2001 |
| WO | WO 00/69528 A1 * | 11/2000 |

OTHER PUBLICATIONS

"Rules of the Game," by the Diagram Group, St. Martin's Press, New York, NY, 1995, chapter on baseball.*

(Continued)

Primary Examiner—Peter Dung Ba Vo
Assistant Examiner—Matthew D. Hoel
(74) Attorney, Agent, or Firm—Arent Fox LLP

(57) ABSTRACT

A tennis game system includes a game machine connected to a television set via an AV cable, and a racket-shaped input device for inputting operation to the game machine. A game player instructs a ball striking player to strike a ball on a monitor screen by operating the racket-shaped input device. At this time, a game processor included in the game machine calculates a predicted return position of a ball returned by the opposite player, compares a current position of the ball striking player with the predicted return position, and judges whether the predicted return position is within a ball strikable range for the ball striking player. If a judgment means judges that the predicted return position is out of the ball strikable range, a ball striking position movement means, i.e. the game processor moves the ball striking position.

13 Claims, 21 Drawing Sheets

U.S. PATENT DOCUMENTS

| | | | |
|---|---|---|---|
| 5,823,878 A * | 10/1998 | Welch | 463/43 |
| 5,846,086 A * | 12/1998 | Bizzi et al. | 434/247 |
| 5,882,204 A * | 3/1999 | Iannazo et al. | 434/251 |
| 6,028,593 A | 2/2000 | Rosenberg et al. | |
| 6,257,893 B1 * | 7/2001 | Trabut | 434/11 |
| 6,257,983 B1 * | 7/2001 | Rimoto | 463/38 |
| 6,308,565 B1 * | 10/2001 | French et al. | 73/379.04 |
| 6,312,335 B1 * | 11/2001 | Tosaki et al. | 463/37 |
| 6,371,849 B1 * | 4/2002 | Togami | 463/4 |
| 6,394,894 B1 * | 5/2002 | Okitsu et al. | 463/3 |
| 6,394,897 B1 * | 5/2002 | Togami | 463/4 |
| 6,398,647 B1 * | 6/2002 | Hirai et al. | 463/31 |
| 6,478,678 B1 * | 11/2002 | Rimoto et al. | 463/31 |
| 6,494,783 B2 * | 12/2002 | Namba et al. | 463/3 |
| 6,503,144 B1 * | 1/2003 | Rimoto et al. | 463/4 |
| 6,746,331 B1 * | 6/2004 | Saikawa et al. | 463/31 |
| 6,767,282 B2 * | 7/2004 | Matsuyama et al. | 463/3 |
| 6,929,543 B1 * | 8/2005 | Ueshima et al. | 463/7 |
| 7,059,963 B2 * | 6/2006 | Okamura et al. | 463/3 |
| 7,199,794 B2 * | 4/2007 | Mifune et al. | 345/428 |
| 7,252,588 B2 * | 8/2007 | Takemoto et al. | 463/4 |
| 2004/0002380 A1 * | 1/2004 | Brosnan et al. | 463/32 |

OTHER PUBLICATIONS

Manual for "Outlaw Tennis" for the XBox, downloaded from www.replacementdocs.com, Mar. 11, 2008.*

Manual for "Beach Volleyball" for the PC, downloaded from www.replacementdocs.com, Mar. 10, 2008.*

Media Works Inc., "Dengeki Nintendo 64"; Nov. 1, 1998, vol. 3, No. 11, pp. 46-49.

* cited by examiner

GAME SYSTEM

CROSS-REFERENCE TO RELATED APPLICATION

This application is a National stage entry of International Application No. PCT/JP03/04861, filed Aug. 11, 2003, the entire specification claims and drawings of which are incorporated herewith by reference.

TECHNICAL FIELD

The present invention relates to a tennis game system. More specifically, the present invention relates to a tennis game system in which game players strike a ball displayed on a monitor screen by turns by operating an input device.

PRIOR ART

In such a conventional kind of tennis game system, a game player generally controls a position of a tennis player on a monitor screen by operating a joy stick or the like provided on a controller as an input device so as to adjust a ball striking position.

Therefore, in any of conventional tennis game systems, the outcome of a game depends on skills and techniques for operating the controller, and thus, these games are hard to play especially for elderly persons and young children.

SUMMARY OF THE INVENTION

It is therefore a primary object of the present invention to provide a tennis game system that is comparatively easy to play for everyone.

A tennis game apparatus according to the present invention is a tennis game system in which a ball striking player and its opposite player by turns strike a bail displayed on a monitor screen, and comprises a means for calculating a predicted return position of the ball returned by the opposite player and a ball striking position moving means for moving a ball striking position of the ball striking player based on the predicted return position.

The tennis game system is, in embodiments, shown by a reference numeral 10, and includes a game machine (12: a reference numeral showing a corresponding part in the embodiments, and so forth.) connected via an AV cable (22) to a television set (20) being a monitor, and a racket-shaped input device (34) for inputting an operation input to the game machine. A game player instructs a ball striking player to strike a ball on the monitor screen by operating the racket-shaped input device. Here, the game machine includes a game processor (52) which constitutes the predicted return position calculating means (step S141) and the ball striking position moving means (steps S145 and S146).

More specifically, the game processor calculates the predicted return position of a ball returned by the opposite player in a step S141 in FIG. 19 of the embodiment, and compares a current position of the ball striking player with the predicted return position so as to judge whether the predicted return position is within a ball-strikable range for the ball striking player (step S143). When a judgment means judges that the position is out of the ball-strikable range, the ball striking position moving means, i.e., the game processor moves the ball striking position.

Assuming that a horizontal direction of the monitor screen is an X-axis, the ball striking position moving means moves the ball striking position in a direction of the X-axis.

When an operating switch (38) is provided on the input device, the position change means (steps S152 and S158 in FIG. 20), in response to an operation of the operating switch, changes the ball striking position in a direction of a Z-axis that is equivalent to a direction perpendicular to the monitor screen, and sets the ball striking position on forward or backward position.

According to the present invention, since the ball striking position of the ball striking player is automatically controlled, the ball striking position could be accurately moved even with poor control or operation of an operating device, which means that everyone including elderly persons and young children can play a game in a relatively easy way.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
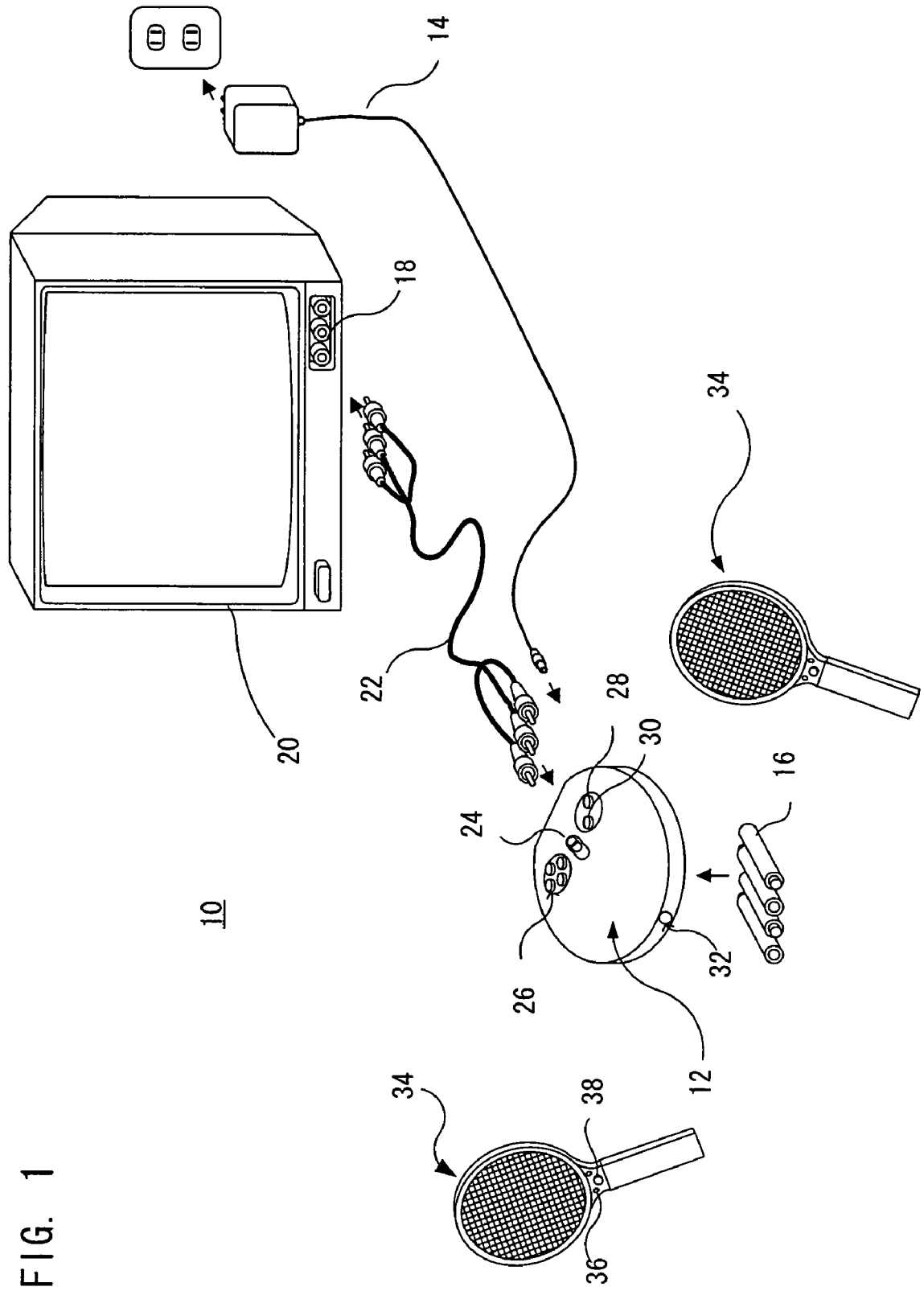
FIG. 1 is an illustrative view showing an entire configuration of a virtual tennis game system in one embodiment of the present invention.

Referring to FIG. 1, a virtual tennis game system 10, one embodiment of the present invention, includes a game machine 12 which is supplied with a direct current power source by an AC adapter 14. The power source may be replaced with batteries 16. The game machine 12 is connected to an AV terminal 18 of a television monitor 20 via an AV cable 22.

The game machine 12 also includes a housing on which a power switch 24 is provided, and direction buttons 26, decision key 28 and cancel key 30 are provided as well. The direction buttons 26 contain four buttons for four directions of movement (up, down, left and right) which are used, for example, to move a cursor in selecting a menu or game mode on a display screen of the television monitor 20. The decision key 28 is used to decide an entry into the game machine 12. The cancel key 30 is utilized for calculating the entry into the game machine 12.

The game machine 12 is further provided with an infrared receiver 32 which receives an infrared signal from an infrared LED 36 on a racked-shaped input device 34 to be hereinafter described.

In this embodiment, two racket-shaped input devices 34 are utilized. Each of the racket-shaped input devices 34 is provided with the infrared LED 36 and a serve switch 38. The serve switch 38 is operated in order to toss a ball for delivering a serve in a tennis game, and is also used as a toggle switch to move a ball striking position forward or backward during a rally to be described later. As mentioned above, the infrared signal from the infrared LED 36 is received by the infrared receiver 32 on the game machine 12. The racket-shaped input devices 34 each are provided with a piezoelectric buzzer element used as an acceleration sensor, and the game machine 12 receives an acceleration correlation signal from the piezoelectric buzzer element to apply a change to a ball 40 on the game screen shown in FIG. 2 or FIG. 3.

Figure 2:
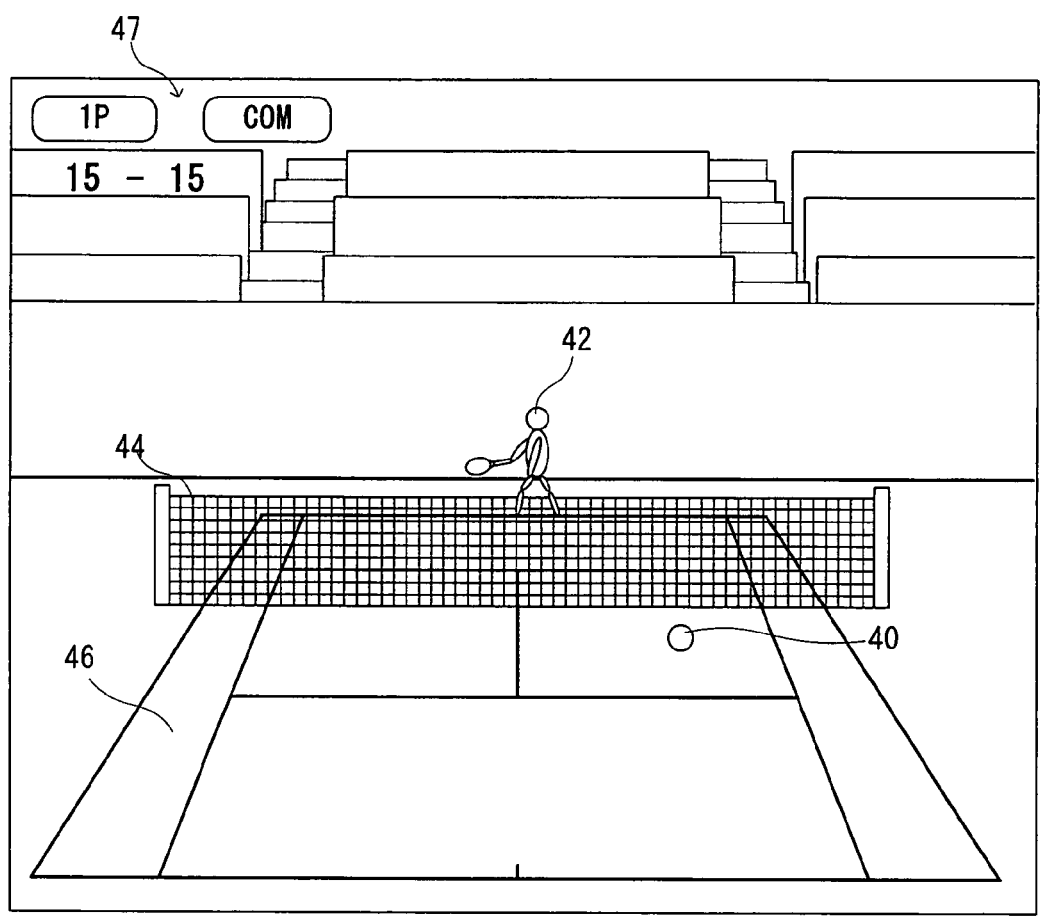
FIG. 2 is an illustrative view showing one example of a game screen displayed on a television monitor in FIG. 1 embodiment.
Figure 3:
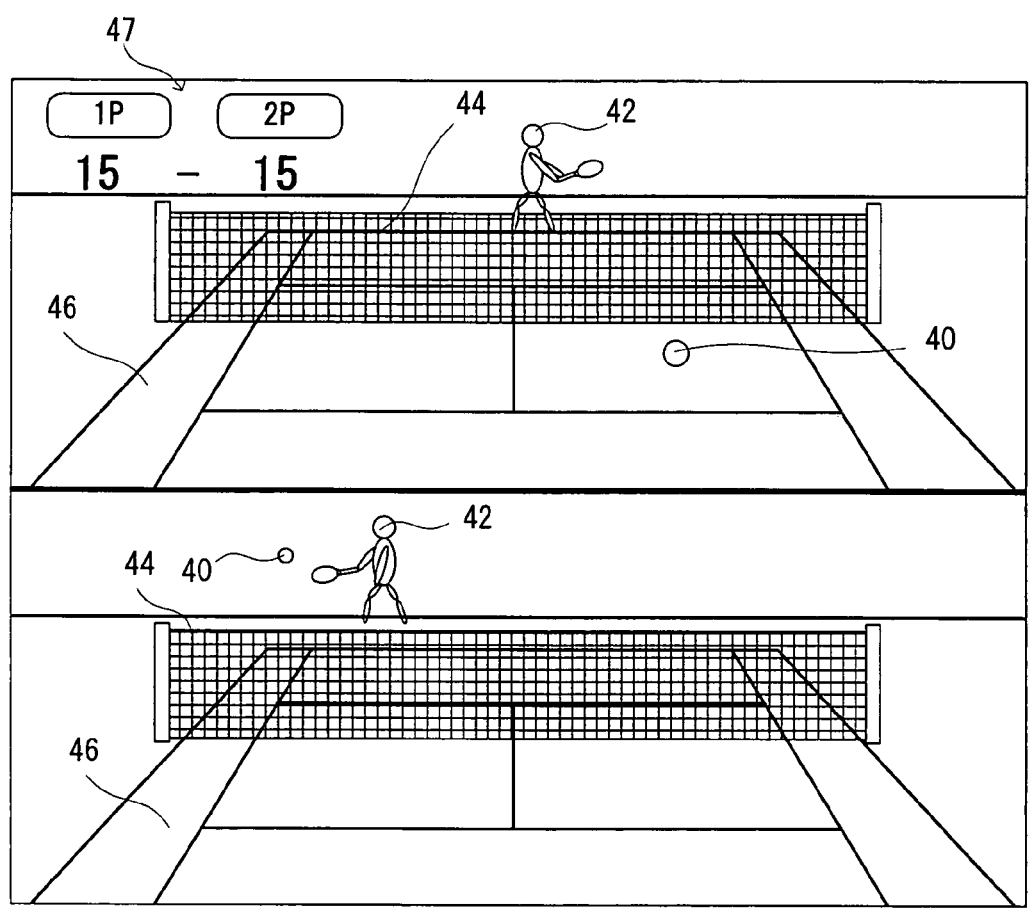
FIG. 3 is an illustrative view showing another example of the game screen displayed on the television monitor in FIG. 1 embodiment.

Referring to FIG. 2, the game screen on the television monitor 20 of the virtual tennis game system 10, displays the ball 40 and a player character 42 as sprite images, and also displays a net character 44 and court character 46 as text screens. In addition, a score display portion 47 is formed to display a score of a tennis game being currently played. For a match-up game as shown in FIG. 3, the display screen of the television monitor 20 is vertically split into two parts, an upper part displaying a view from one tennis player, and a lower part displaying a view from the other tennis player. Each of the upper and lower part displays the ball 40, player character 42, net character 44 and court character 46.

In this virtual tennis game system 10, when a game player actually swings the racket-shaped input device 34 in a real space in a manner which is timed with a movement of the ball 40 in the game screen, a game processor 52 (FIG. 4) detects an acceleration correlation signal from the piezoelectric buzzer element, by means of an infrared signal conveyed from the infrared LED 36 to the infrared receiver 32. For instance, the ball 40 is moved toward the opposite side of the court 46 as if the ball 40 bounced off the racket, according to a timing with which the racket-shaped input device 34 has reached a predetermined movement speed and a position of the ball 40 on the screen. The game processor 52 judges whether the ball 40 is in or out of the court depending on the moved position of the ball 40. If the timing of swinging the racket-shaped input device 34 is inconsistent with the position of the ball 40 on the screen, the game processor 52 recognizes that as a swing and miss (letting the ball pass).

Figure 4:
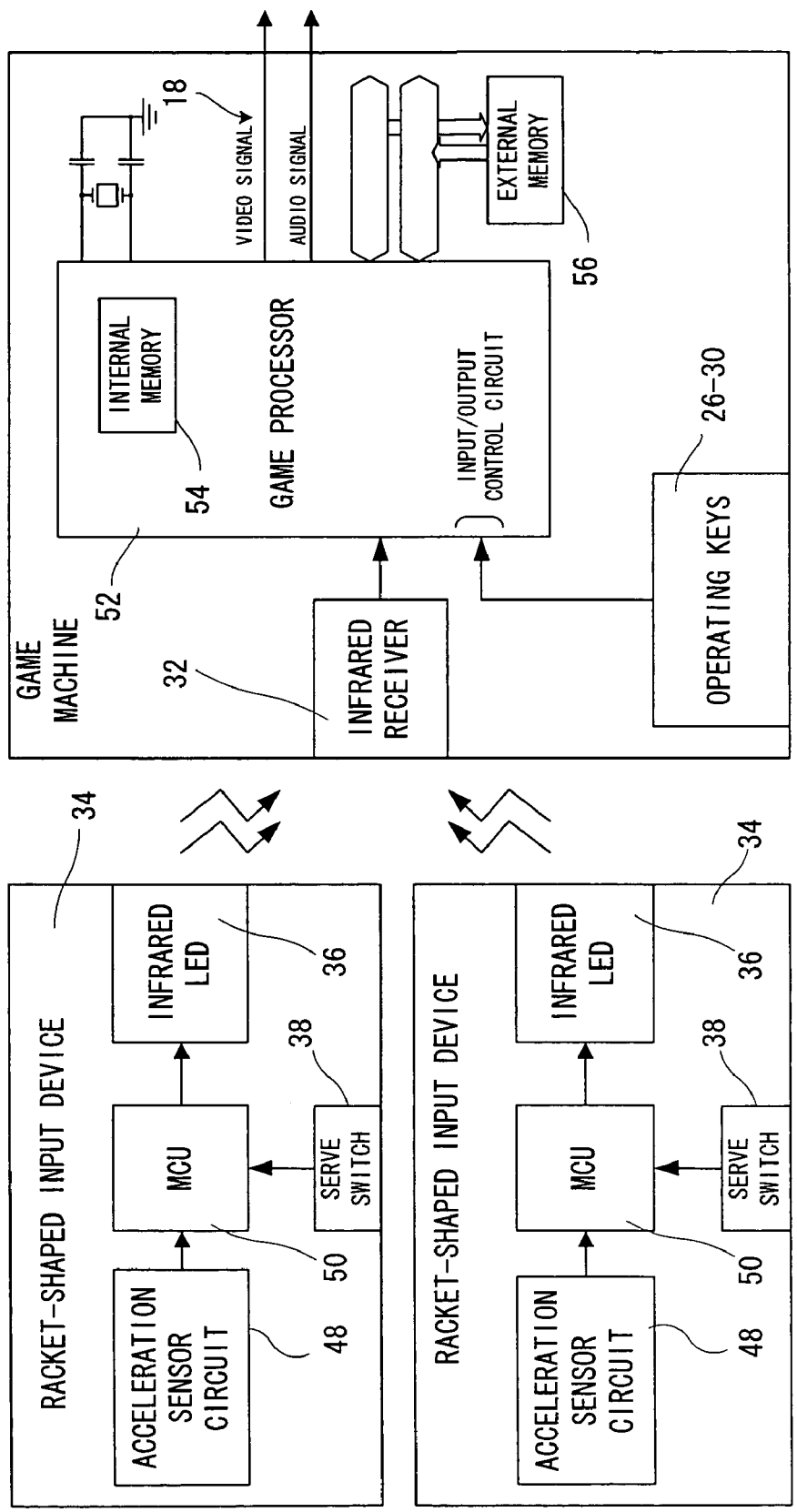
FIG. 4 is a block diagram showing FIG. 1 embodiment.
Figure 5:
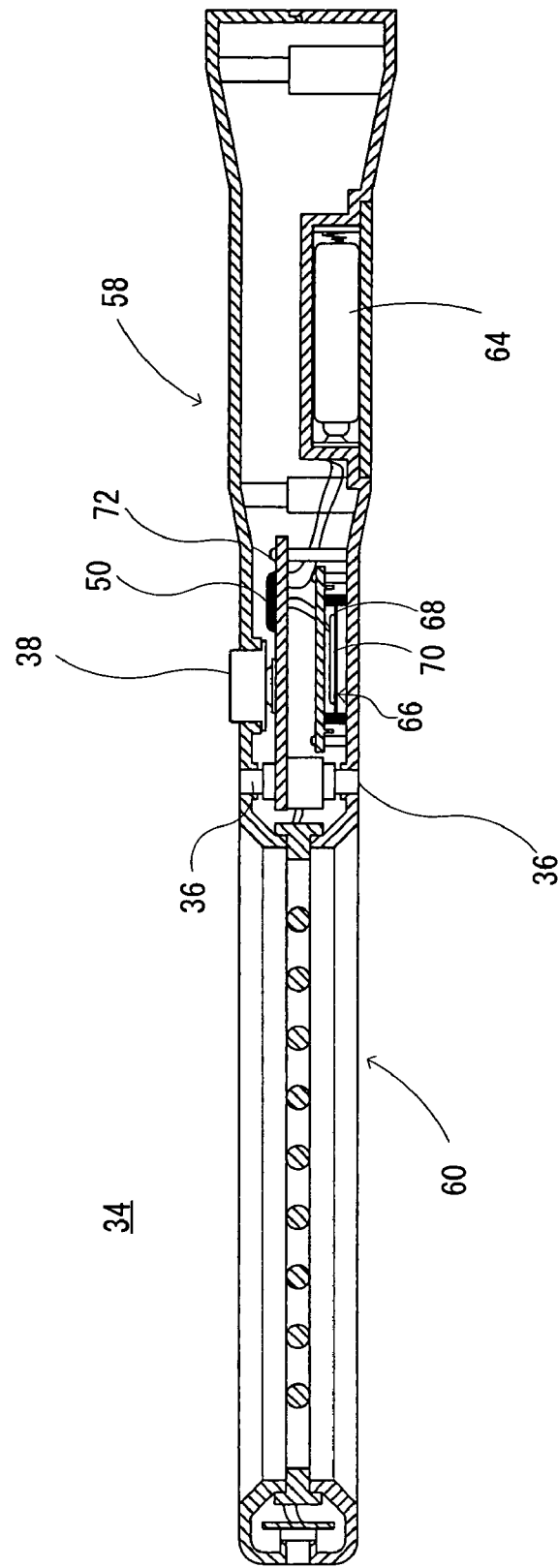
FIG. 5 is an illustrative view showing inner structure of a racket-shaped input device in FIG. 1 embodiment.

Referring to FIG. 4, the racket-shaped input device 34 includes the infrared LED 36 and the serve switch (key switch) 38 as mentioned above, and further incorporates an acceleration sensor circuit 48. The acceleration sensor circuit 48 includes a piezoelectric buzzer element 66 and its related circuit as shown in FIG. 5 to be described below, and an acceleration correlation signal from the acceleration sensor circuit 48 is supplied to an MCU 50. The MCU 50 may be, for example, an 8-bit single-chip microcomputer, and converts the acceleration correlation signal from the piezoelectric buzzer element to a digital signal and applies it to the infrared LED 36.

A digital-modulated infrared signal from the infrared LED 36 on each of the two racket-shaped input devices 34, is received and digital-demodulated by the infrared receiver 32 of the game machine 12, and then is input to the game processor 52. One bit of this digital signal is transmitted as "1" or "0" depending on ON or OFF of the switch 38. Therefore, by checking that bit, the game processor 52 can identify which game player delivered a serve.

As the game processor 52, an arbitrary kind of processor can be utilized. This embodiment uses a high-speed processor that has been developed and filed as a patent application by the applicant. This high-speed processor is disclosed in detail, for example, in Japanese Patent Laying-open No. H10-307790 [G06F13/36, 15/78] and U.S. Pat. No. 6,070, 205 corresponding thereto.

The game processor 52, although not illustrated, includes various processors such as a CPU, graphic processor, sound processor and DMA processor, and also includes an A/D converter used for fetching an analog signal, and an input/output control circuit that receives input signals such as key operation signals and an infrared signal and supplies output signals to an external device. Thus, a demodulated signal from the infrared receiver 32 and input signals from the operating keys 26 to 30 are applied to the CPU through this input/output control circuit. The CPU performs required operations in response to these input signals, and supplies an operation result to the graphic processor, etc. The graphic processor and the sound processor thus perform an image processing and a sound processing in accordance with the operation result.

The processor 52 is provided with an internal memory 54 which includes a ROM or RAM (SRAM and/or DRAM). The RAM is used as temporary memory, working memory, counter, or register area (temporary data area) and flag area. The processor 52 is connected with an external memory 56 (ROM and/or RAM) through an external bus. This external memory 56 is preinstalled with a game program.

The processor 52 performs an arithmetic operation, graphic processing and sound processing at each relevant processor according to the input signals from the infrared receiver 32 and operating keys 26 to 30, and outputs a video signal and an audio signal. The video signal is a composite of text screens and sprite images shown in FIG. 2 or FIG. 3 as mentioned above. These video signal and audio signal are supplied to the television monitor 20 through the AV cable 22 and AV terminal 18. Therefore, such a game screen as shown in FIG. 2 or FIG. 3, for example, is displayed on the television monitor 20 with the reproduction of required sounds (sound effects and game music).

In this virtual tennis game system 10, briefly speaking, the game machine 12, i.e., the game processor 52 receives acceleration data contained in infrared signals from the two racket-shaped input devices 34, decides a movement parameter of the ball 40 (FIG. 2) when the acceleration of the racket-shaped input device 34 reaches a peak, and moves the ball 40 in the game screen according to the parameter.

The racket-shaped input device 34, as shown in FIG. 5, includes a grip part 58 and a ball striking part or racket face part 60 extending from one end of the grip. The grip part 58 and the racket face part 60 are integrally formed by a two-halved plastic housing.

On the inside of the racket face part 60 of the plastic housing in the racket-shaped input device 34, bosses are formed to join the two-halved housing, and the piezoelectric buzzer element 66 is fixed to constitute the acceleration sensor circuit 48 (FIG. 4). The piezoelectric buzzer element 66, as is well known, includes a ceramic plate 70 stuck on a metalic plate 68, and makes a buzzer sound when a voltage is applied between the metalic plate 68 and an electrode on the ceramic plate 70. In this embodiment, the piezoelectric buzzer element 66 configured that way is utilized as an acceleration sensor. That is, it is well known that the ceramic plate 70 is made of a piezoelectric ceramic and generates an electrical signal when the piezoelectric ceramic comes under the influence of stress. In this embodiment, therefore, an electrical signal generated in response to the movement of the piezoelectric buzzer element 66, i.e., the racket-shaped input device 34 on the ceramic plate 70 is taken out from between the metalic plate 68 and the above-mentioned electrode. In this embodiment, however, by performing predetermined digital signal process in accordance with the electrical signal, an acceleration correlation digital signal or data is fetched into the MCU 50 as described later.

Inside the housing, a printed circuit board 72 is also mounted with the bosses. On the printed circuit board 72, the serve switch 38 is placed, the MCU 50 shown in FIG. 4 mounted, and further the infrared LED 36 attached.

Figure 6:
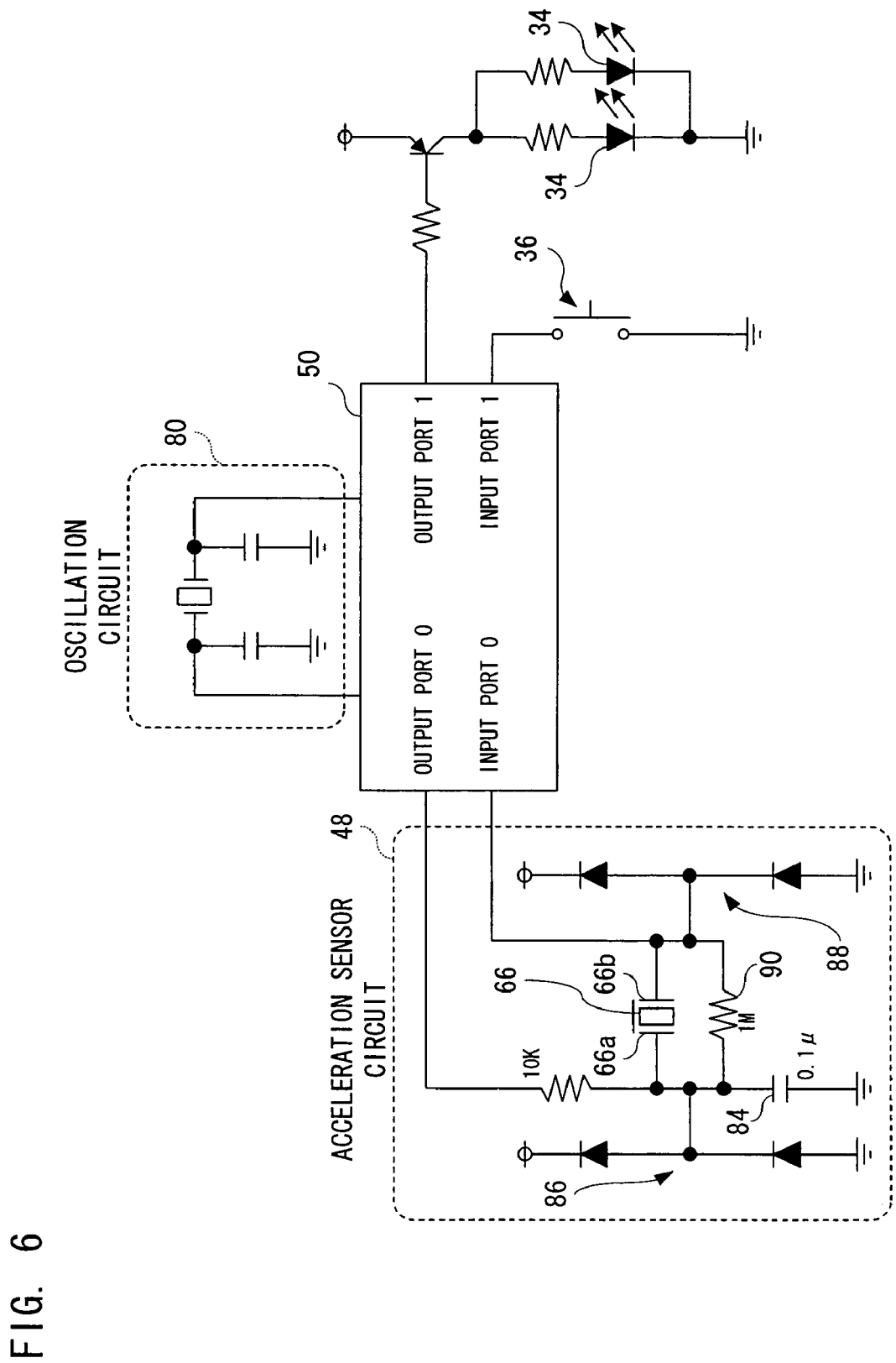
FIG. 6 is a circuit diagram showing the racket-shaped input device.

Referring to FIG. 6, the piezoelectric buzzer element 66 described above is included in the acceleration sensor circuit 48. In addition, the MCU 50 is provided with an external oscillation circuit 80, and operates in response to a clock signal from the oscillation circuit 80.

The MCU 50 outputs a rectangular wave signal from an output port 0, and applies it to one electrode 66a of the piezoelectric buzzer element 66, for example, via a 10 kΩ resistor 82. The electrode 66a of the piezoelectric buzzer element 66 is grounded, for example, via a 0.1 µF capacitor 84. The electrode 66a is also connected with a diode circuit 86 so as to keep voltage variations within a certain range.

The other electrode 66b of the piezoelectric buzzer element 66 is connected to an input port 0 of the MCU 50, and is also connected to a diode circuit 88 so as to keep voltage variations within a certain range. The two electrodes 66a and 66b of the piezoelectric buzzer element 66 are electrically isolated with a relatively high resistor 90 of 1 MΩ, for example.

When a rectangular wave signal shown in FIG. 7(A) is applied to the electrode 66a of the piezoelectric buzzer element 66, such a triangular wave signal as shown in FIG. 7(B) is input into the input port 0 of the MCU 50 as the capacitor 84 charges or discharges electricity. A magnitude of the rectangular wave signal (the peak value) and a magnitude of the triangular signal (the peak value) depend on the diode circuits 86 and 88, respectively.

When the racket-shaped input device 34 (FIG. 4) stands still, that is, it is not displaced, the lower side of the triangular wave signal remain unchanged as shown in a left part of FIG. 7(B). However, when the racket-shaped input device 34 is displaced by an operator in a three-dimensional space, a piezoelectric effect due to the displacement produces a voltage on the piezoelectric buzzer element 66. This acceleration correlation voltage biases the minus level of the rectangular wave signal. Consequently, when the racket-shaped input device 34 is displaced, the acceleration correlation voltage is produced on the piezoelectric buzzer element 66 at a level in accordance with a magnitude of the movement acceleration. Thus the minus level of the triangular signal input into the input port 0 of the MCU 50, varies depending on the level of the acceleration correlation voltage 92 as shown in FIG. 7(B).

The MCU 50, as described later, converts such variations in the lower side of the triangular wave signal into acceleration data, and drives the LED 36 based on the acceleration data.

Figure 8:
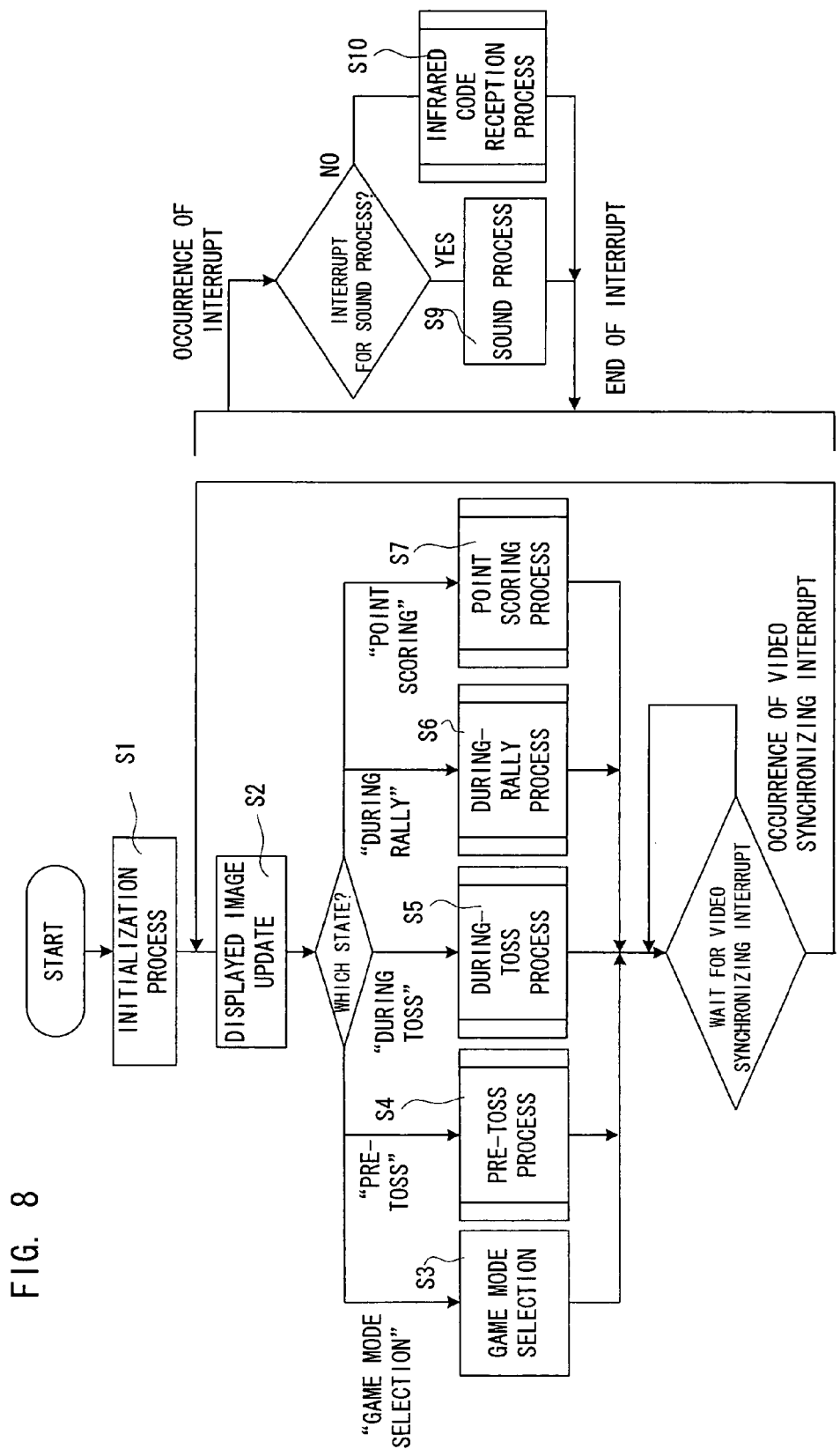
FIG. 8 is a flowchart showing an entire operation of FIG. 1 embodiment.
Figure 9:
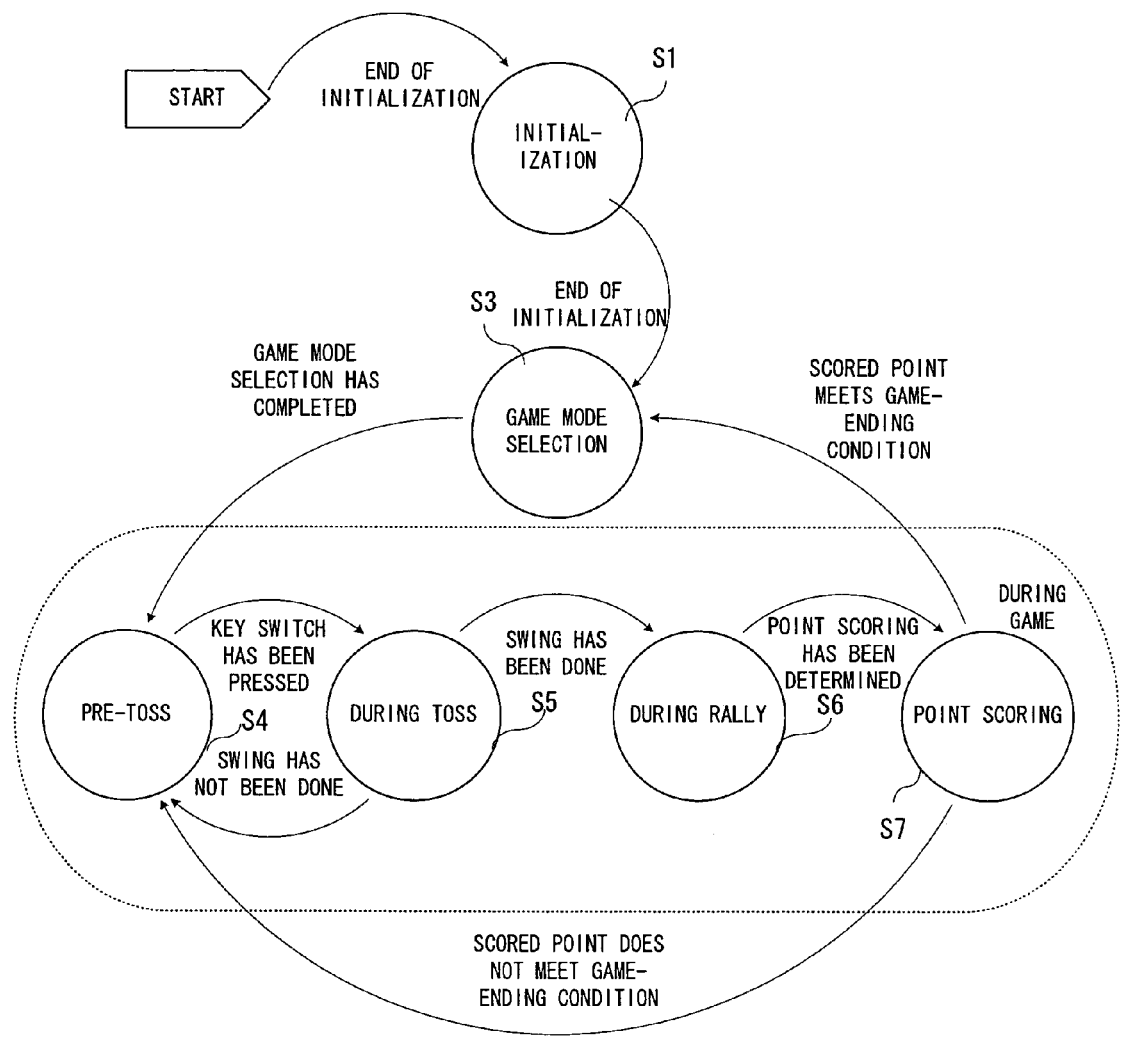
FIG. 9 is an illustrative view showing state or state transition of FIG. 1 embodiment.

Referring to FIG. 8 and FIG. 9, an operation of the virtual tennis game system 10 according to FIG. 1 embodiment is now outlined. A game can be started by turning on the power switch 24 shown in FIG. 1. The game processor 52 shown in FIG. 4 firstly performs initialization in a step S1, and more specifically, it initializes the system and all variables.

The game processor 52 then updates an image signal in a step S2 to renew an image displayed on the monitor 20. The update of a displayed image is carried out on a frame-by-frame basis (television frame or video frame).

Figure 7:
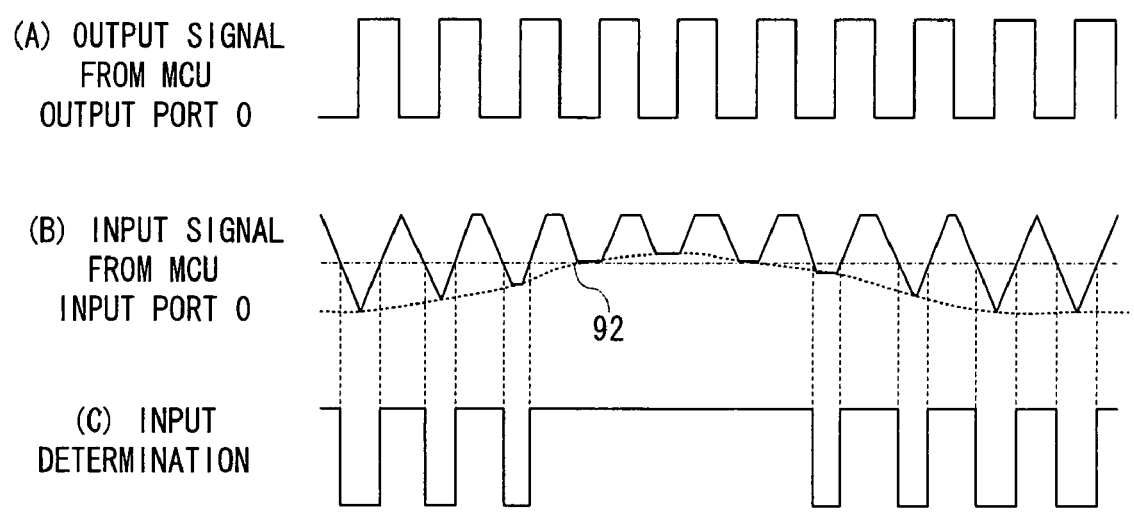
FIG. 7 is a waveform chart showing an operation of the racket-shaped input device.

The game processor 52 performs a process in accordance with a system state. The first process is a selection of a game mode. For this game mode selection, an operator or game player, in a step S3 as shown in FIG. 7, operates the selection keys 26 shown in FIG. 1 to select between an one-person play mode and two-person play mode, or select between a singles mode and doubles mode, and sets the difficulty level of a game, etc.

A real tennis game begins with a serve and enters into a rally. For delivering a serve, it is necessary to toss the ball 40 (FIG. 2 and FIG. 3) in the game screen. Thus, the game processor 52 performs a pre-toss process in a step S4, and then carries out a during-toss process in a step S5. That is, if the serve switch 38 is pressed during the pre-toss process, the game processor 52 proceeds to the during-toss process. If the racket-shaped input device 34 is not swung during the during-toss process, the game processor 52 returns to the pre-toss process. Also if the racket-shaped input device 34 is swung during the during-toss process, the game processor 52 then moves to a during-rally process in a step S6. If a point is determined in the during-rally process, the game processor 52 moves to a point scoring process in a step S7. Depending on whether or not the scored point meets a condition for ending a game, the game processor 52 returns to the game mode selection (S3) or the pre-toss process (S4).

As shown in FIG. 8, after the during-toss process in the step S5 and the during-rally process in the step S6, the game processor 52 performs a coordinate arithmetic operation for the ball 40 in a step S8 to displace the ball 40 (FIG. 2 and FIG. 3) in the game screen according to the acceleration data from the racket-shaped input devices 34.

Subsequently, if there is an interrupt by a video synchronizing signal, the game processor 52 carries out an image update shown in the step S2 (FIG. 8). If an audio interrupt takes place, a sound process is performed in a step S9, thereby outputting game music and sound effects such as ball striking sounds. If an interrupt occurs for other than the sound process, the game processor 52 receives the infrared signal (code) input from the infrared receiver 32 in a step S10 of FIG. 8.

Figure 10:
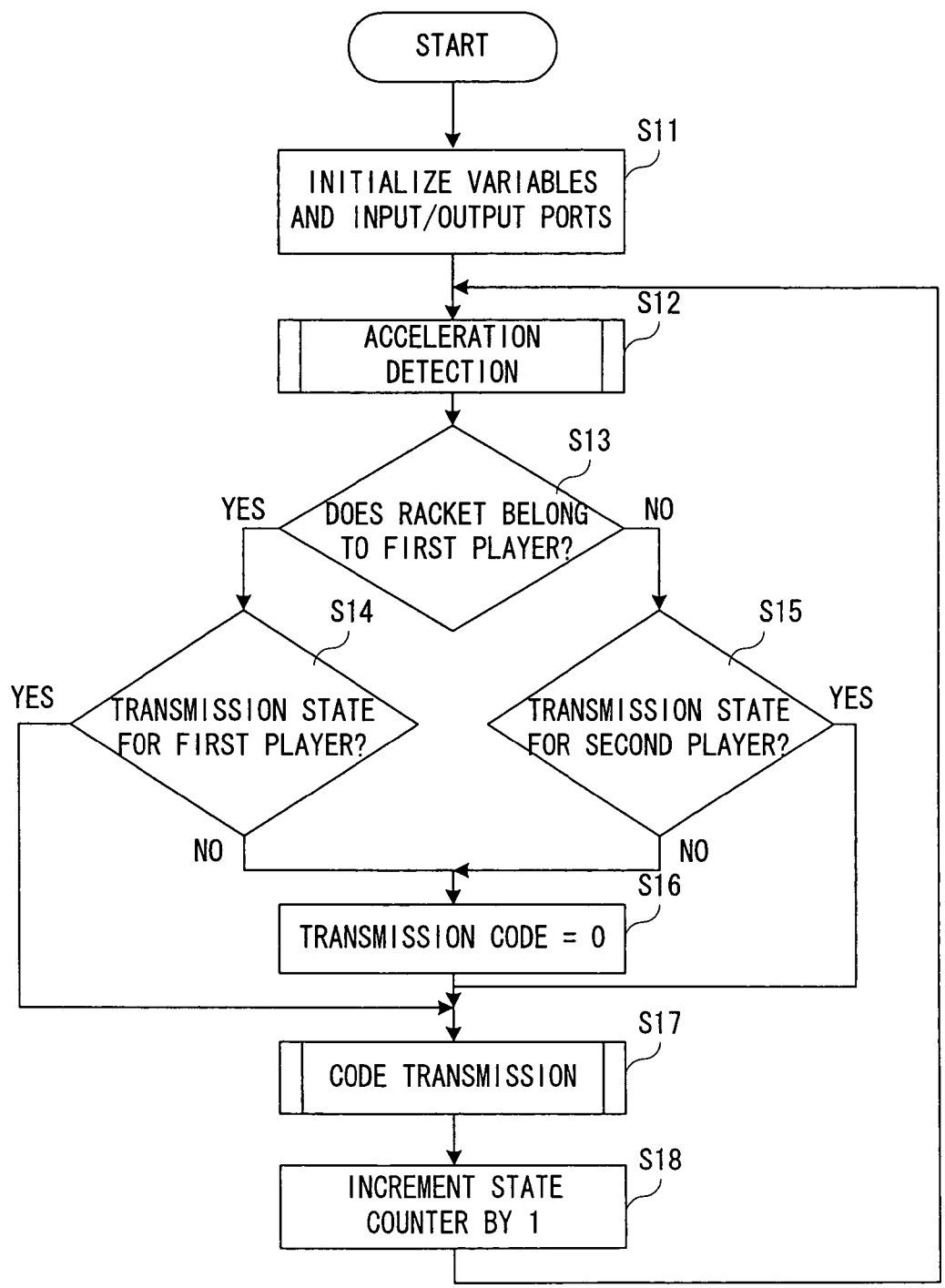
FIG. 10 is a flowchart showing an entire operation of an MCU in FIG. 4 embodiment.

Referring to FIG. 10, this FIG. 10 shows an entire operation of the MCU 50. In a first step S111, the MCU 50 initializes variables to be handled by the MCU 50, such as a detected offset value and offset counter value described later, and also initializes the input ports and the output ports (FIG. 6).

After acceleration detection (described below) in a step S12, the MCU 50 judges whether the racket-shaped input device 34 belongs to a first player in a step S13. That can be determined by checking a particular input port of the MCU 50 in step S13: the input device 34 belongs to the first player if the particular input port of the MCU 50 is set to "1", and the input device 34 belongs to the second player if the particular input port is set to "0". Then if "YES" in the step S13, i.e., the input device 34 belongs to the first player, the MCU 50 determines whether a transmission state has been established in a step S14, or if "NO" in the step S13, i.e., the input device 34 belongs to the second player, the MCU 50 determines whether a transmission state has been established in a step S15.

Although not illustrated, the MCU 50 has a state counter as a software counter, and the transmission state is rendered each time the state counter reaches a predetermined value. In the steps S14 and S15, therefore, the MCU 50 detects whether the state counter has reached the predetermined value. If "NO" in the step S14 or S15, the MCU 50 sets a transmission code to "0" in a step S16. Reversely, if "YES" in the step S14 or S15, the MCU 50 proceeds straight to a code transmission process in a step S17 (described later in detail). After performing the code transmission process in the step S17, the MCU 50 increments the state counter (not illustrated) by 1 (one) in a step S18 and returns to the step S12. As described later, the code transmission process is performed in a bit-serial fashion, and a time required to do this is as extremely short as a few microseconds.

Figure 11:
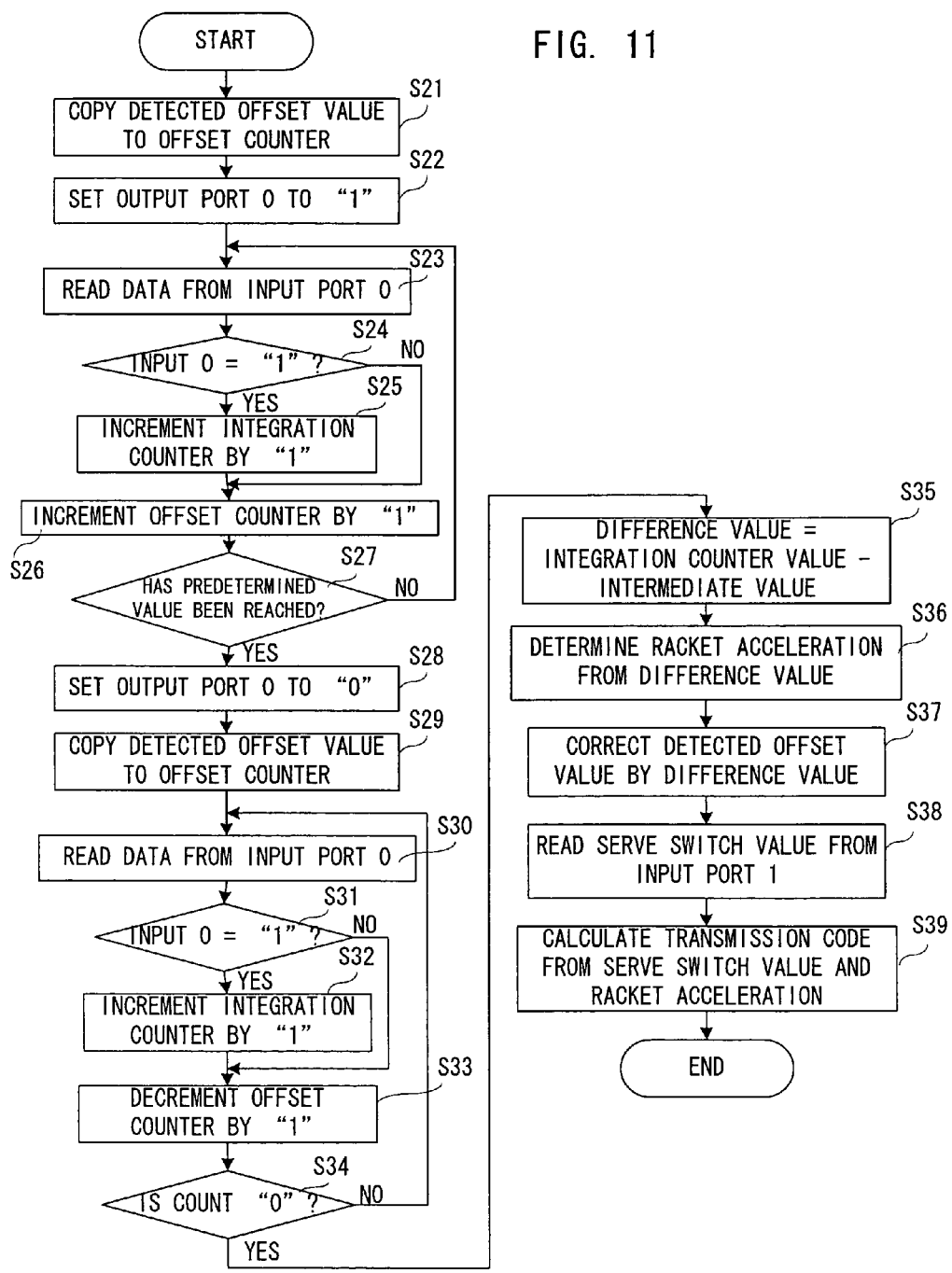
FIG. 11 is a flowchart showing a specific operation of an acceleration detection process shown in FIG. 10.

FIG. 11 is a flowchart showing details of the step S12 in FIG. 10. In a first step S21 of the acceleration detection process, the MCU 50 copies the detected offset value set in a register (not illustrated) into an offset counter (not illustrated). The detected offset value is used to input a high level and low level for determining a rectangular wave shown in FIG. 7(A) in a time-homogeneous manner when no voltage is generated on the piezoelectric buzzer element 66. At a start of the operation, the detected offset value is set to an arbitrary default value.

After the step S21, the MCU 50 sets the output port 0 to "1" in a step S22. Thus, the output port 0 outputs "1", i.e. a high-level signal. Then in a step S23, the MCU 50 reads data from the input port 0.

In a step S24, the MCU 50 judges whether the data read from the input port 0 in the step S23 is "1". If "YES", the MCU 50 increments an integration counter (not illustrated) by 1 (one) in a next step S25. The integration counter is used to calculate a time period during which a high level was read in. The integration counter is incremented when the relevant input port is set to "1" or high level, and the counter is not incremented when the port is set to "0".

If the integration counter was incremented in the step S25 or "NO" was determined in the step S24, the MCU 50 increments the offset counter in a step S26 and then determines whether the offset counter has reached a specified value in a step S27. That is, after setting the output port 0 to "1" in the step S22, the MCU 50 continues to output "1" from the output port 0 until it judges that "NO" is determined in step S27.

When the MCU 50 determined that the offset counter has reached the predetermined value in the step S27, it sets the output port 0 to "0", i.e. a low level in a step S28. Then the MCU 50 copies the detected offset value stored in the register into the offset counter in a step S29.

In a succeeding step S30, the MCU 50 reads data from the input port 0. In a step S31, the MCU 50 judges whether the data read from the input port 0 in the step S30 is "1". If "YES", the MCU 50 increments the integration counter by 1 (one) in a next step S32.

In a case where the integration counter was incremented in the step S32 or "NO" was determined in the step S31, the MCU 50 decrements the offset counter by 1 (one) in a step S33 and determines whether the offset counter has reached 0 (zero) in a step S34. That is, after setting the output port 0 to "0" in the step S28, the MCU 50 continues to output "0" from the output port 0 until it judges that "NO" is determined in the step S34.

If "YES" is determined in the step S34, i.e. the offset counter has reached zero (0), the MCU 50 subtracts an intermediate value from a count value of the integration counter to obtain a difference value. The intermediate value here is N/2, assuming that N is a total number of the repeating times of returning from the step S27 to the step S23 for high level detection and the repeating times of returning from the step S34 to the step S30 for low level detection. A reason why the difference value is evaluated by using the intermediate value in a step S35 is to render a ratio between a high-level period and a low-level period (duty ratio: 50%) in a state that an ideal piezoelectric buzzer element is used and no acceleration correlation voltage is produced on the piezoelectric buzzer element a criterion or base for determining the acceleration.

More specifically, the integration counter counts the number of times of reading "1" or high-level data from the input port 0 as mentioned above, and if an ideal piezoelectric buzzer element is used and no acceleration correlation voltage is generated on the piezoelectric buzzer element, the difference value of "the integration counter value—the intermediate value" should be zero. Accordingly, if any voltage occurs on the piezoelectric buzzer element 66, a significant value can be obtained as the difference value. Thus in a step S36, the displacement acceleration for the racket-shaped input device 34 is decided in accordance with this difference value. In principle, the acceleration data is obtained by multiplying the difference value by a predetermined coefficient.

After that, the MCU 50 corrects the detected offset value in a step S37 based on the difference value obtained in the step S35. Since a game player or operator does not swing the racket-shaped input device 34 in the initial state, no acceleration correlation voltage occurs on the piezoelectric buzzer element 66. Nevertheless, if a difference value other than zero is detected in the step S35, this means that the detected offset value set in the step S21 is not correct in terms of the characteristics of the piezoelectric buzzer element used in the racket-shaped input device. In other words, this means that the current piezoelectric buzzer element is not an ideal piezoelectric buzzer element. Thus, in order to correct deviations in characteristics between the current piezoelectric buzzer element and the ideal piezoelectric buzzer element, the detected offset value is corrected according to the difference value in the step S37.

On the other hand, if a setting is made so as to invariably change or correct a detected offset value in the step S37, the detected offset value would be corrected even on the basis of a difference value resulting from the actual presence of the acceleration correlation voltage on the piezoelectric buzzer element. However, the period of voltage generation on the piezoelectric buzzer element is very short as compared to other periods. There is thus no problem in performing the step S37 each time the difference value is detected. Accordingly, the detected offset value is properly corrected at the start of the tennis game, and does not fluctuate so greatly even if the step S37 is performed each time the acceleration is detected, which thus causes no interference with the tennis game.

In a next step S38, the MCU 50 reads a value "1" or "0" via the input port 1 from the key switch, i.e., serve switch 38. Next, in a step S39, the MCU 50 adds a parity bit to calculate the transmission code based on the value from the key switch 38 and the displacement acceleration or movement acceleration of the racket-shaped input device 34 decided in the step S36, and returns to the step S13 in the main routine (FIG. 10).

Figure 12:
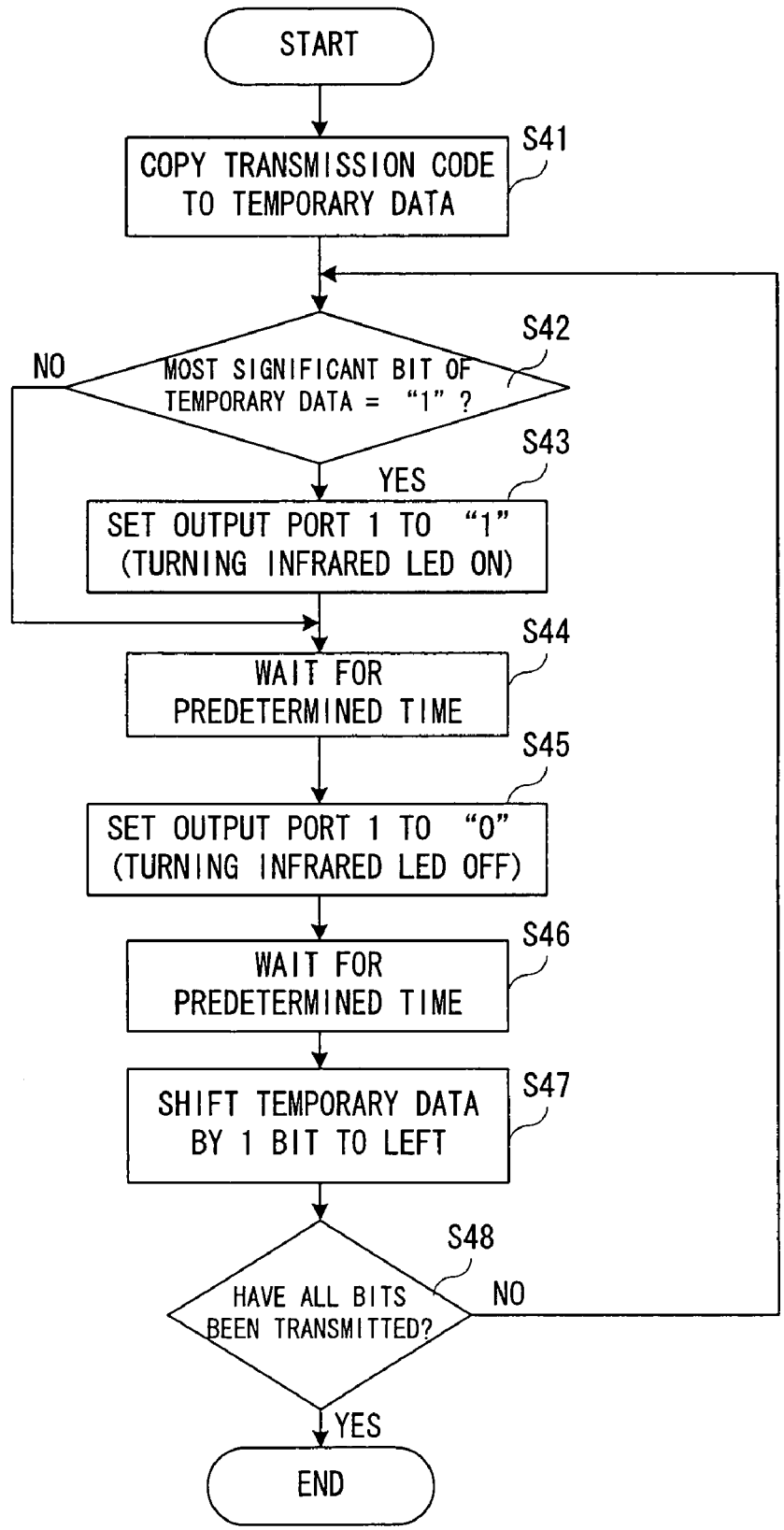
FIG. 12 is a flowchart showing a specific operation of a code transmission process in FIG. 10 embodiment.

Now referring to FIG. 12, the code transmission from the racket-shaped input device 34 to the game processor 52 in the step S17 (FIG. 10) is described below. In a first step S41, the MCU 50 copies the transmission code produced in the step S12 or S16 into the temporary data register (not illustrated). Then, the MCU 50 determines whether a most significant bit of the code is "1". If the most significant bit is "1", the MCU 50 judges "YES" in a step S42, and sets the output port 1 to "1" to turn on the LED 36 (FIG. 4) in a step S43. After that, the MCU 50 waits for a predetermined waiting time in a step S44. However, if "NO" in the step S42, i.e., the most significant bit is "0", the process proceeds straight to a step S44.

After the predetermined waiting time has elapsed in the step S44, the MCU 50 sets the output port 1 to "0" and turns off the LED 36 in a step S45. Then, the MCU 50 waits for a predetermined waiting time in a step S46.

After the predetermined waiting time has elapsed in the step S46, the MCU 50 shifts the temporary data to the left by one bit in a step S47 so as to make a transmitted bit least significant. That is, the MCU 50 shifts a bit to be transmitted for the bit-serial transmission. Then in a step S48, the MCU 50 determines whether all the bits have been transmitted. If "NO", the process returns to the step S42. If "YES", the process comes to an end and the MCU 50 moves to the step S18 shown in FIG. 10.

Figure 13:
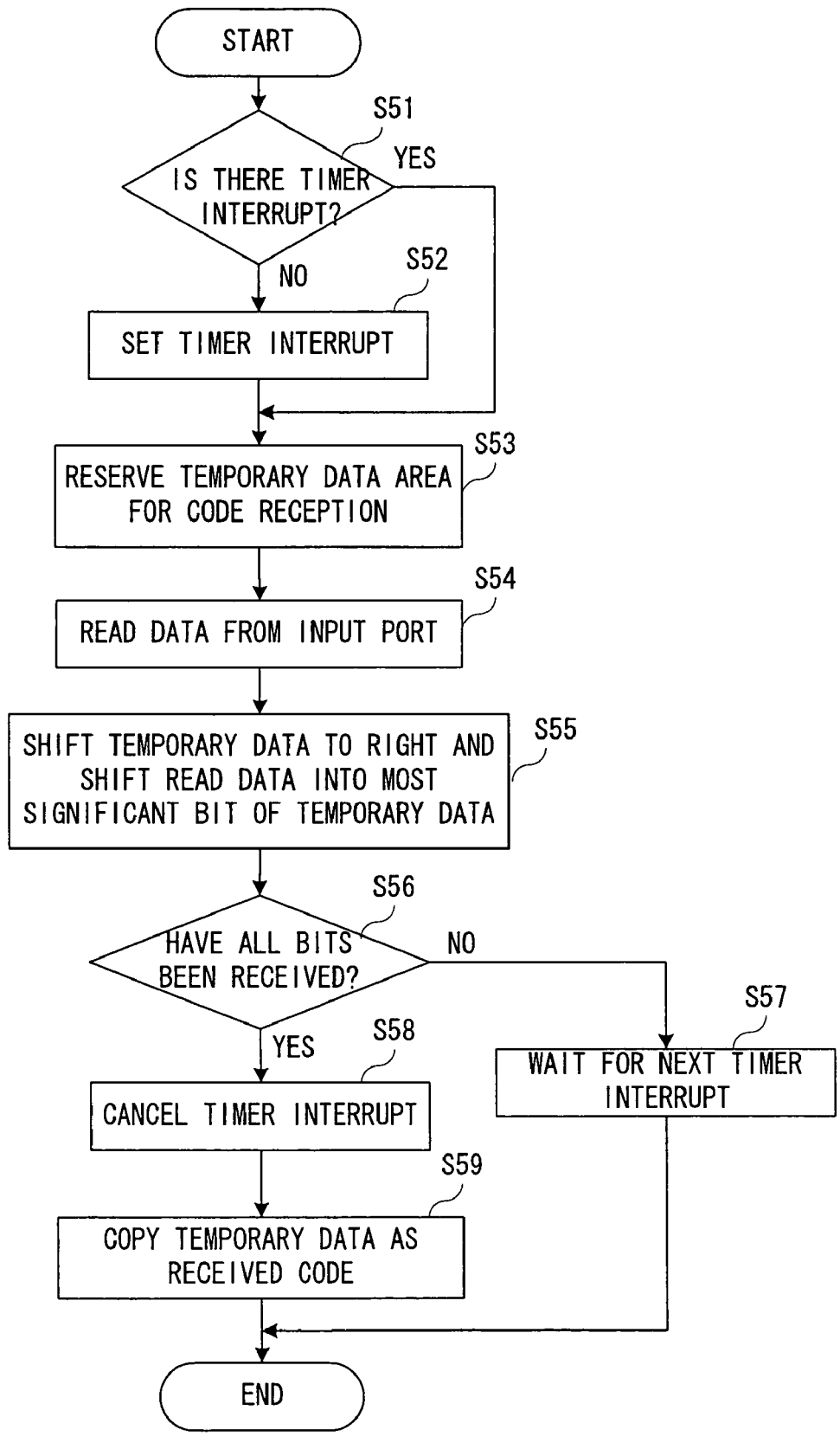
FIG. 13 is a flowchart showing a specific operation of a code reception process by a game processor in FIG. 8 embodiment.

Now referring to FIG. 13, the code reception process by the game processor 52 in the step S10 shown in FIG. 8 is described below. Since this code reception process is driven by means of a timer interrupt, the game processor 52 determines whether or not there is a timer interrupt in a first step S51. If "NO", the game processor 52 sets a timer interrupt in a step S52. If "YES", the process goes straight to a step S53.

In the step S53, the game processor 52 reserves a temporary data area for code reception in the memory 54 (FIG. 4). Next, in a step S54, the game processor 52 reads data from the input port to which an output signal is input from the infrared receiver 32. Then, in a step S55, the game processor 52 shifts the temporary data to the right so as to make the data read in the step S54 of the most significant bit of the temporary data.

Subsequently, the game processor 52 determines whether all the bits have been received in a step S56. If "NO", the game processor 52 waits for a next timer interrupt in a step S57. If "YES", the game processor 52 cancels the current timer interrupt in a step S58, and copies the temporary data as a received code in a step S59. The game processor 52 performs the game process shown in FIG. 8 using this received code.

Figure 14:
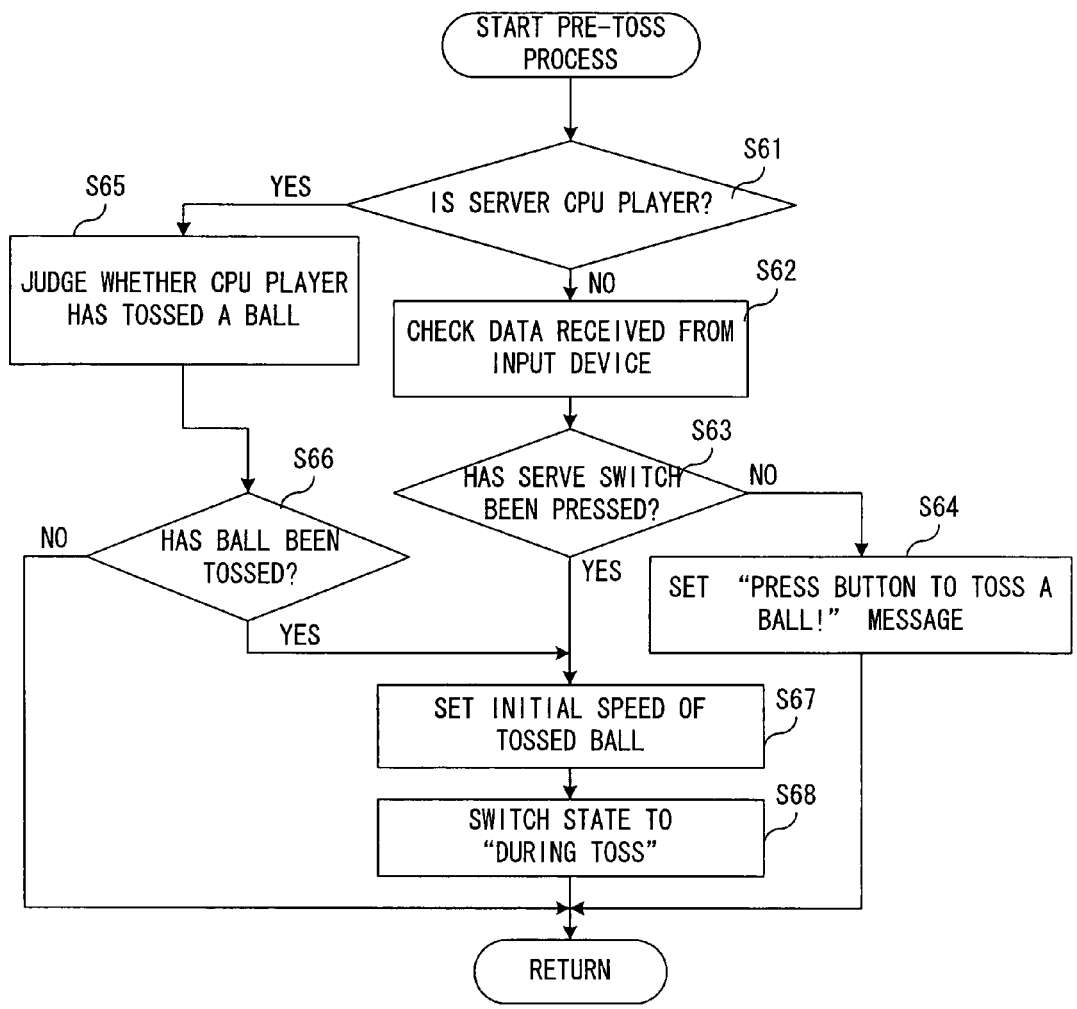
FIG. 14 is a flowchart showing a specific operation of a pre-toss process by the game processor in FIG. 8 embodiment.

As previously shown in FIG. 8, after the game mode selection in the step S3, the game processor 52 performs the "pre-toss" process in the step S6. More specifically, the pre-toss process is carried out in accordance with a flowchart shown in FIG. 14.

In a first step S61 of the pre-toss process, the game processor 52 judges whether the server is a CPU player (not a game player), using a random number at the start of the game and, after that, based on rules of a real tennis game.

If "NO" in the step S61, this means that the game player using the racket-shaped input device needs to serve a ball. The game processor 52 thus checks data received from the input device 34 in a step S62. More specifically, the game processor 52 checks the data temporarily stored in the memory 54. Then based on the received data, the game processor 52 determines whether the serve switch 38 has been pressed. If "NO" in a step S63, the game processor 52 displays a message, for example, "Press the button to toss a ball!" in a step S64 to prompt the game player to toss a ball, i.e., operate the serve switch 38.

If "YES" is determined in the step S61, the game processor 52 determines whether the CPU player has tossed a ball in steps S65 and S66. If the CPU player has tossed a ball, the game processor 52 decides axial speeds Vx, Vy and Vz of the ball in a step S67 for the tossing of the ball 40 (FIG. 2 and FIG. 3) in the "during-toss" process, as in the case where "YES" is determined in a step S63. After that, the game processor 52 switches its state to "during-toss" in a step S68.

Figure 15:
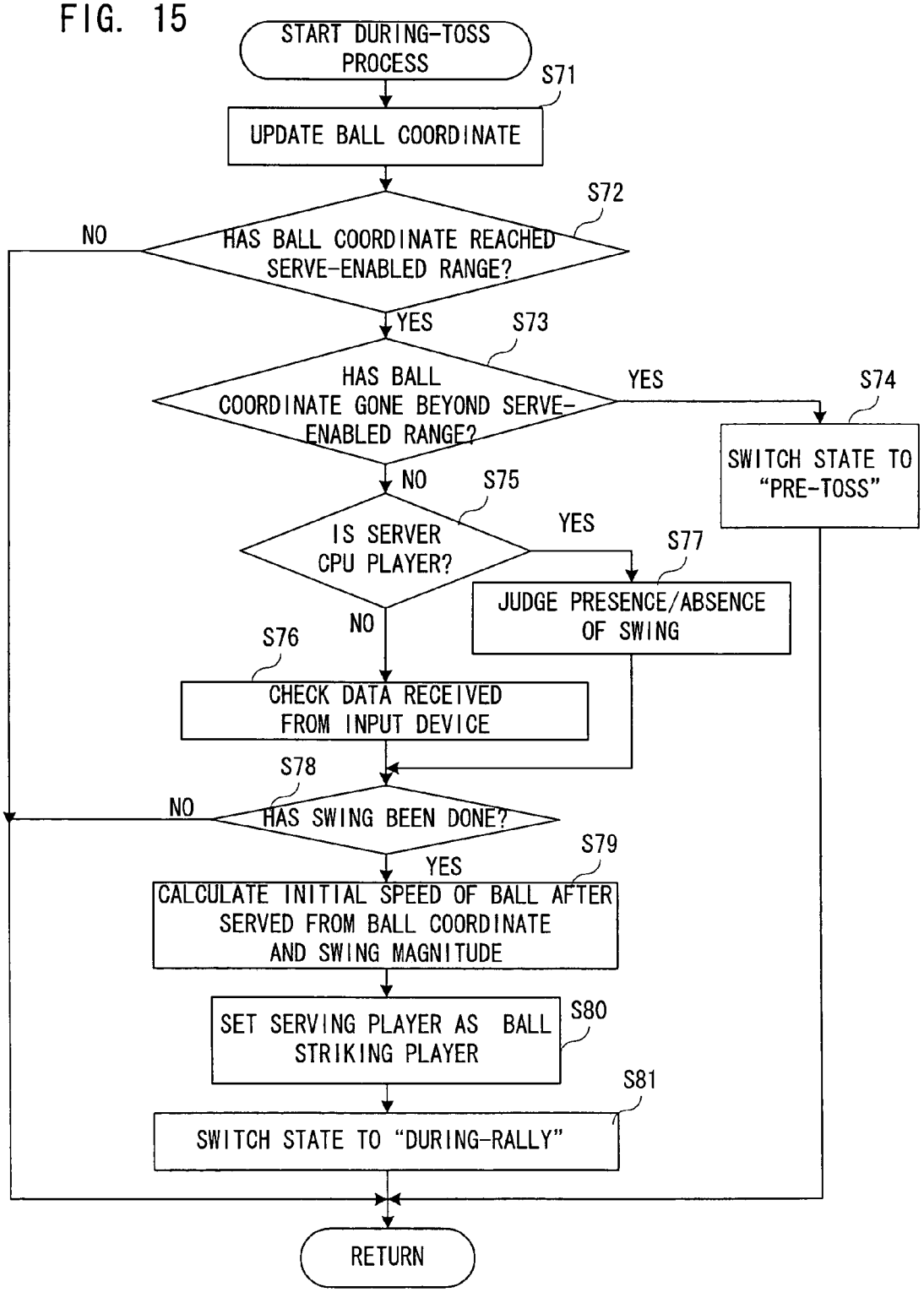
FIG. 15 is a flowchart showing a specific operation of a during-toss process by the game processor in FIG. 8 embodiment.

The "during-toss" process is performed in accordance with a flowchart shown in FIG. 15. Specifically, the game processor 52 updates axial coordinates Px, Py and Pz of the tossed ball in a first step S71, and based on the updated coordinates, determines whether the position of the ball has reached a range in which a serve can be delivered in a step S72. For example, it is impossible to serve a ball if the position of Y axis, i.e., a height of the ball becomes out of a predetermined value range, and the game processor 52 thus judges whether the ball has reached within such a serve-enabled range that was set in advance.

If "YES" in the step S72, the game processor 52 judges whether the ball position has gone beyond the serve-enabled range in a step S73. If "YES", i.e., the ball is out of the serve-enabled range in the step S73, the game processor 52 returns the axial coordinates of the tossed ball to the pre-toss state, and switches its state to "pre-toss" again in a step S74.

If a result is "NO" in the step S73, i.e., the ball is within the serve-enabled range, the game processor 52 determines whether the server is a CPU player in a step S75. If the game processor 52 judged that the server is a game player ("NO") in the step S75, it checks the data received from the racket-shaped input device 34 operated by the game player in a step S76. Reversely, if "YES" is determined in the step S75, the game processor 52 judges the presence or absence of a swing (the presence or absence of a process equivalent to the game player's swinging the racket-shaped input device 34) in a step S77 according to a predetermined algorithm for the action of the CPU player. Then, the game processor 52 judges whether a swing (or an action equivalent to that) has been performed in a step S78.

If the result of a judgment on a swing is "YES", the game processor 52 calculates an initial speed of the ball after served from the ball coordinates and the magnitude of the swing in a step S79. If the server is a game player, the game processor 52 detects the displacement acceleration in the direction perpendicular to the racket surface of the racket-shaped input device in the step S79, using the code incoming from the racket-shaped input device operated by the game player, thereby detecting the magnitude of the swing and calculating the initial speed of the ball based on the swing magnitude. This terminates the ball serving operation, and the game processor 52 thus sets the server as a next ball striking player in a step S80, and switches its state to "during-rally" in a step S81.

Figure 16:
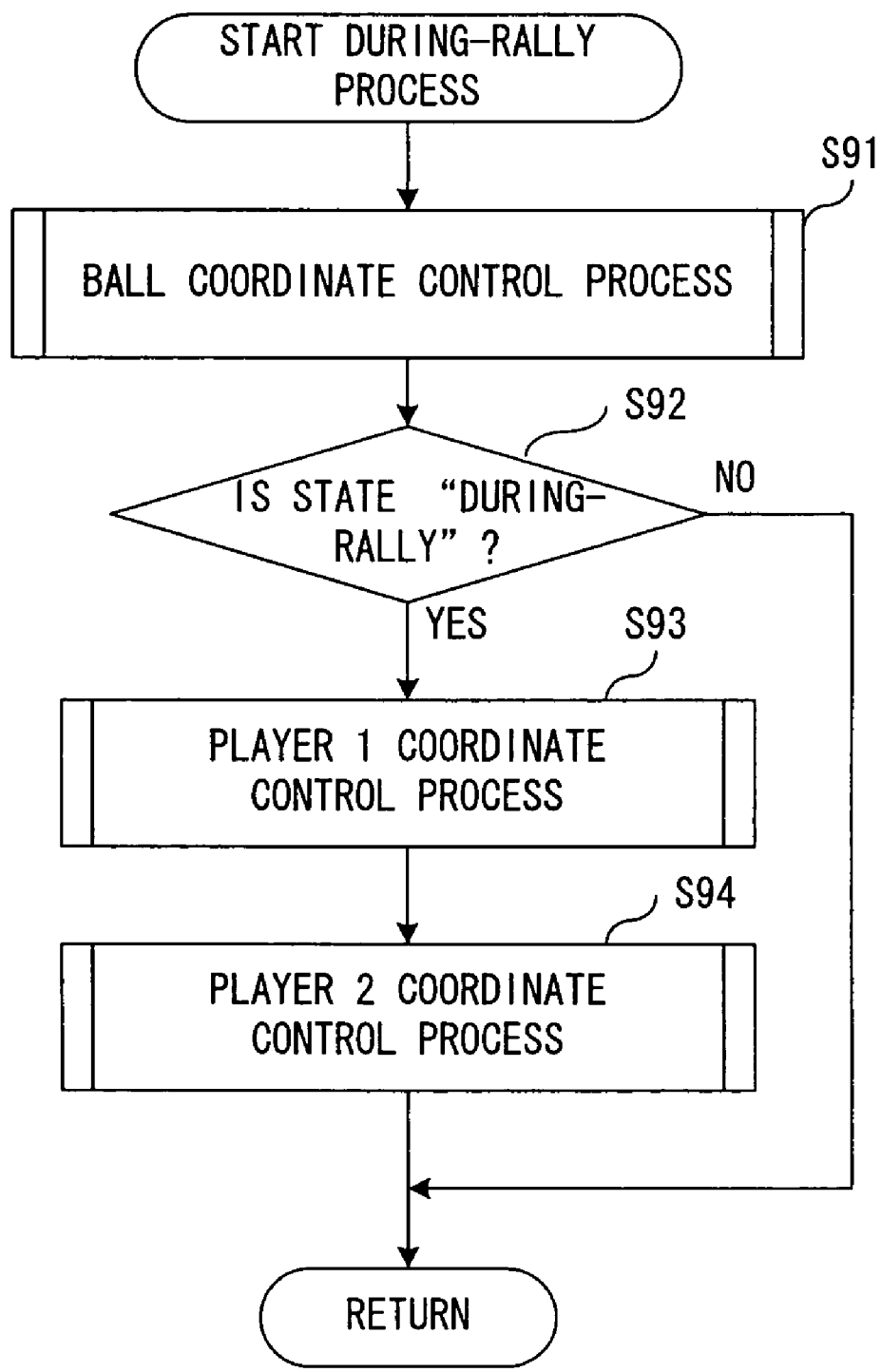
FIG. 16 is a flowchart showing a specific operation of during-rally process by the game processor in FIG. 8 embodiment.

The "during-rally" process is executed in accordance with a flowchart shown in FIG. 16. Specifically, the game processor 52 performs the ball coordinate control in a first step S91, and determines whether the state of the process is "during-rally" in a step S92. If "NO", the process returns. If "YES", the game processor 52 executes the coordinate control for the player 1 and player 2 in steps S93 and S94, respectively.

Figure 17:
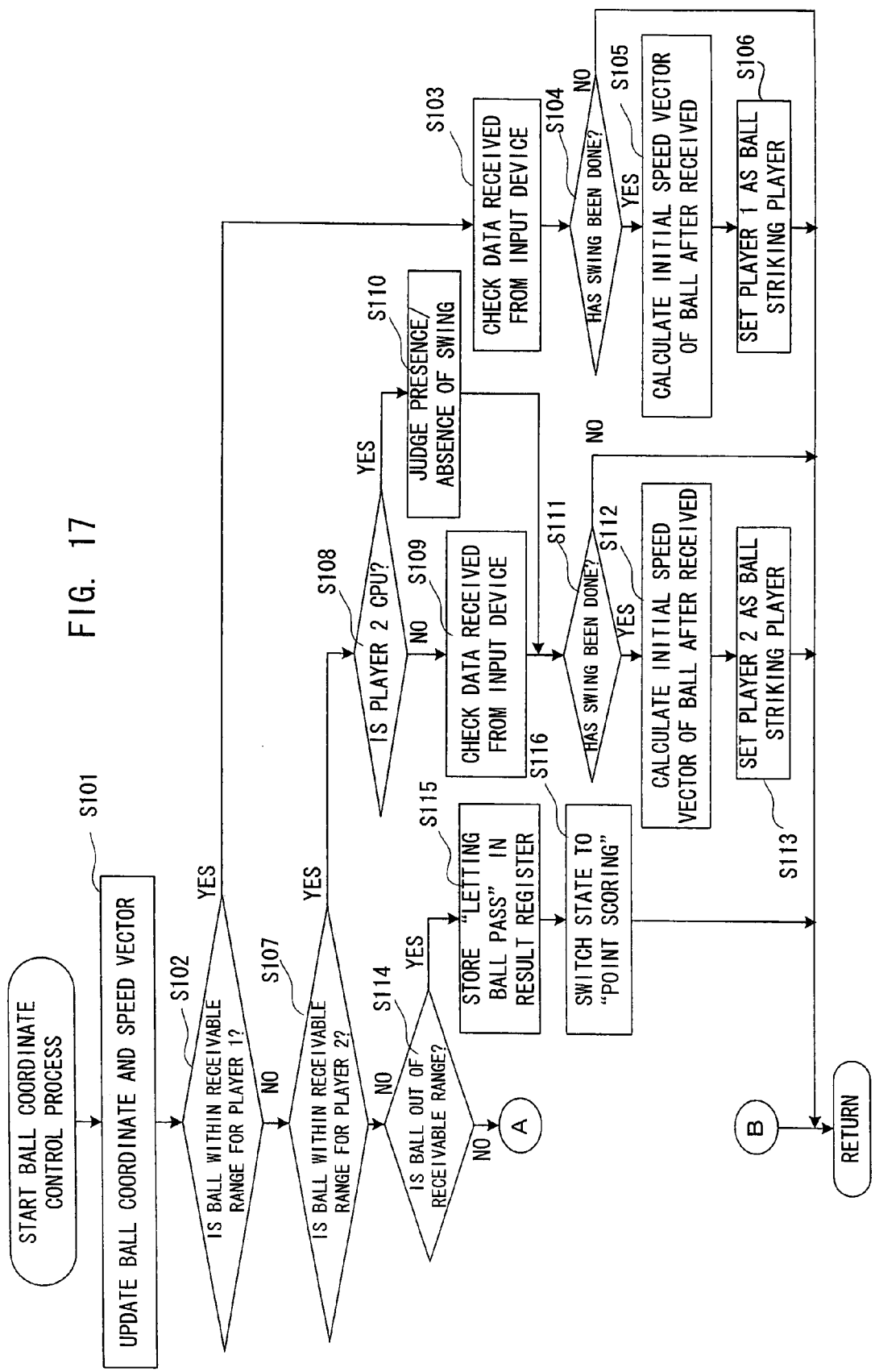
FIG. 17 is a flowchart showing one part of a specific operation of a ball coordinate control process by the game processor in FIG. 8 embodiment.
Figure 18:
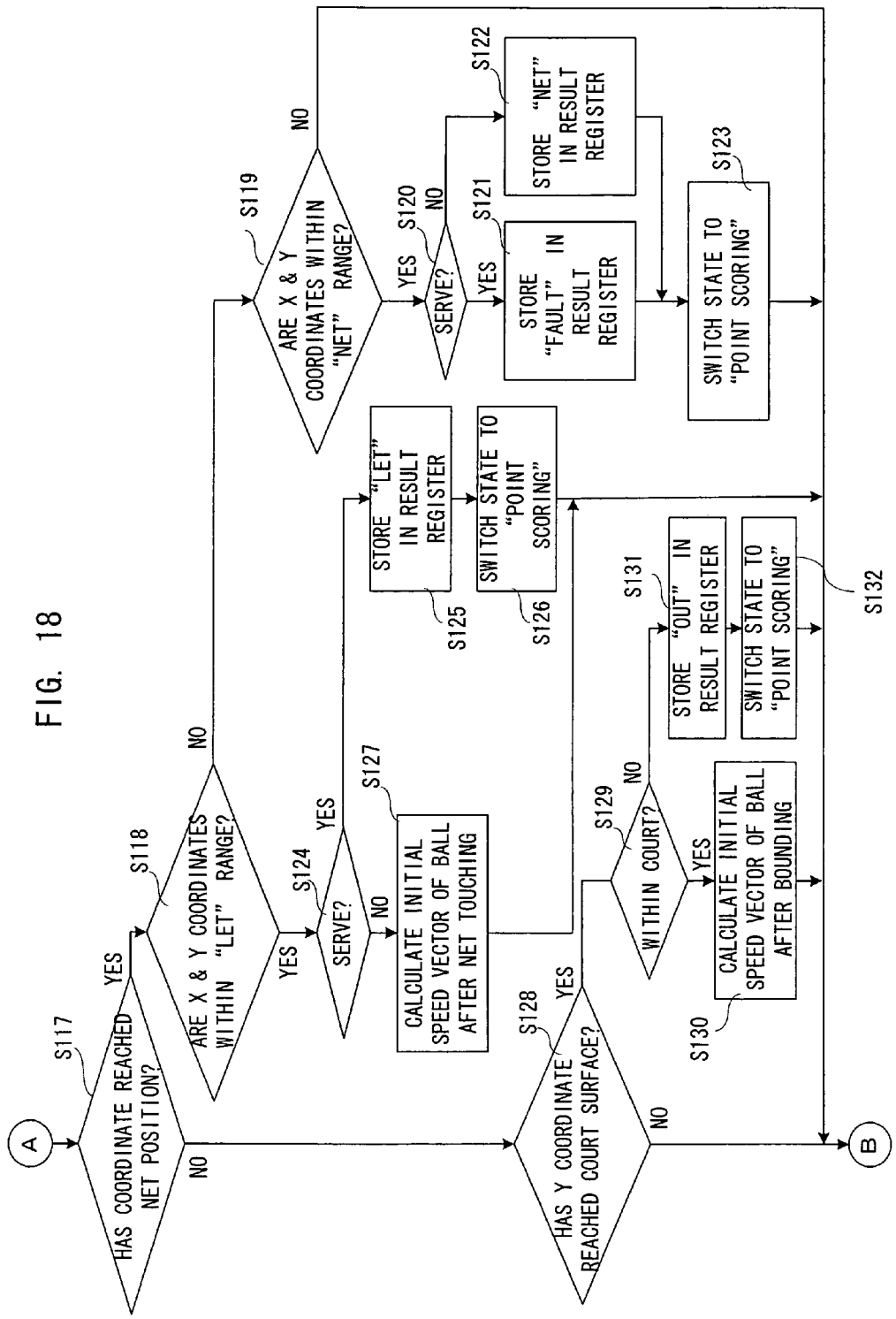
FIG. 18 is a flowchart showing another part of the specific operation of the ball coordinate control process.

More specifically, the process for ball coordinate control in the step S91 is executed in accordance with flowcharts shown in FIG. 17 and FIG. 18.

In a first step S101 shown in FIG. 17, the game processor 52 updates the axial coordinates Px, Py and Pz and a speed vector of the served ball, and determines whether the position (coordinates) of the ball is within a receivable range for the player 1 in a step S102. If the result is "YES" in the step S102, the game processor 52 checks the data received from the racket-shaped input device of the player 1, and judges whether the racket-shaped input device was swung based on the received data in a step S103. If the result is "NO", the game processor 52 returns the process straight to the step S92 (FIG. 16). If "YES", the game processor 52 calculates an initial speed vector of the ball after received in a next step S105, based on the coordinates of the ball and the magnitude of the swing (i.e. the acceleration of the racket-shaped input device when it is swung). Then the game processor 52 sets the player 1 as a ball striking player in a step S106, and returns the process to the step S92.

If "NO" in the step S102, the game processor 52 determines whether the ball position is within the receivable range for the player 2. If the result is "YES" in a step S107, the game processor 52 determines whether the player 2 is the CPU in a step S1108. If the result is "NO", the game processor 52 checks the data received from the racket-shaped input device of the player 2 in a step S109, and if "YES", the game processor 52 judges the presence or absence of a swing (or a signal corresponding to that) in a step S110. Then, the game processor 52 determines whether a swing has been performed in a step S111. If "NO" in the step S111, the process returns as it is. If "YES", however, the game processor 52 calculates the initial speed vector of the ball after received in a step S112, based on the coordinates of the ball and the magnitude of the swing (i.e., the acceleration of the racket-shaped input device when it is swung). In a step S113, the game processor 52 sets the player 2 as a ball striking player, and then returns to the step S92.

If the result is "NO" in the step S107, i.e., the ball is out of the receivable range as described above, the game processor 52 judges whether the ball is beyond the receivable range in a step S114. As aforesaid, a certain range defined by the axes X, Y and Z is preset as a receivable range in which a receiving player can strike a ball back. In the steps S102, S107 and S114, therefore, the game processor 52 judges whether the ball is within the receivable range.

If the result is "YES" in the step S114, i.e., the ball is out of the receivable range, the game processor 52 stores the result "letting the ball pass" in a result register (established in the memory 54) in a step S115, and switches its state to "point scoring process" in a step S116.

If "NO" is determined in the step S114, i.e., the ball is within the receivable range, the game processor 52 judges whether the Z coordinate of the ball has reached the position of the net in a first step S117 of FIG. 18. If "YES" is determined in the step S117, the game processor 52 determines whether the X and Y coordinates of the ball are within the range in which a "Let" is called in a step S118. If "NO", the game processor 52 determines whether the X and Y coordinates of the ball are within the range in which a "Net" is called in a step S119. If "NO", the process returns straight, but if "YES", the game processor 52 judges whether the struck ball is a serve or not in a step S120. If "YES" in the step S120, the game processor 52 stores a "Fault" in the result register in a step S121, and, if "NO", it stores a "Net" in the result register. In either case, the game processor 52 switches its state to "point scoring" in a step S123, and returns the process.

If "YES" is determined in the step S118, i.e., the ball has reached the "Let" range, the game processor 52 determines whether the struck ball is a serve or not in a step S124. If "YES" is determined in the step S124, the game processor 52 stores a "Let" in the result register in the step S121, switches its state to "point scoring" in a step S126, and returns the process. If "NO", the game processor 52, based on the speed vector of the ball, calculates the initial speed vector of the ball after touching the net, and the process returns.

If "NO" in the step S117, i.e., the Z coordinate of the ball has not reached the net position, the game processor 52 judges whether the Y coordinate of the ball has reached the court surface (i.e., the ball 40 has fallen in the court 46 on the monitor screen) in a step S128. If "YES" in the step S128, the game processor 52 determines whether the X and Z coordinates of the ball are within the court in a step S129.

If "NO", the game processor 52 stores an "Out" in the result register in a step S131, and switches its state to "point scoring" in a step S132, and the process returns. If "YES" in the step S129, the game processor 52, based on the speed vector of the ball, calculates the initial speed vector of the ball after bounding, and returns the process.

Figure 19:
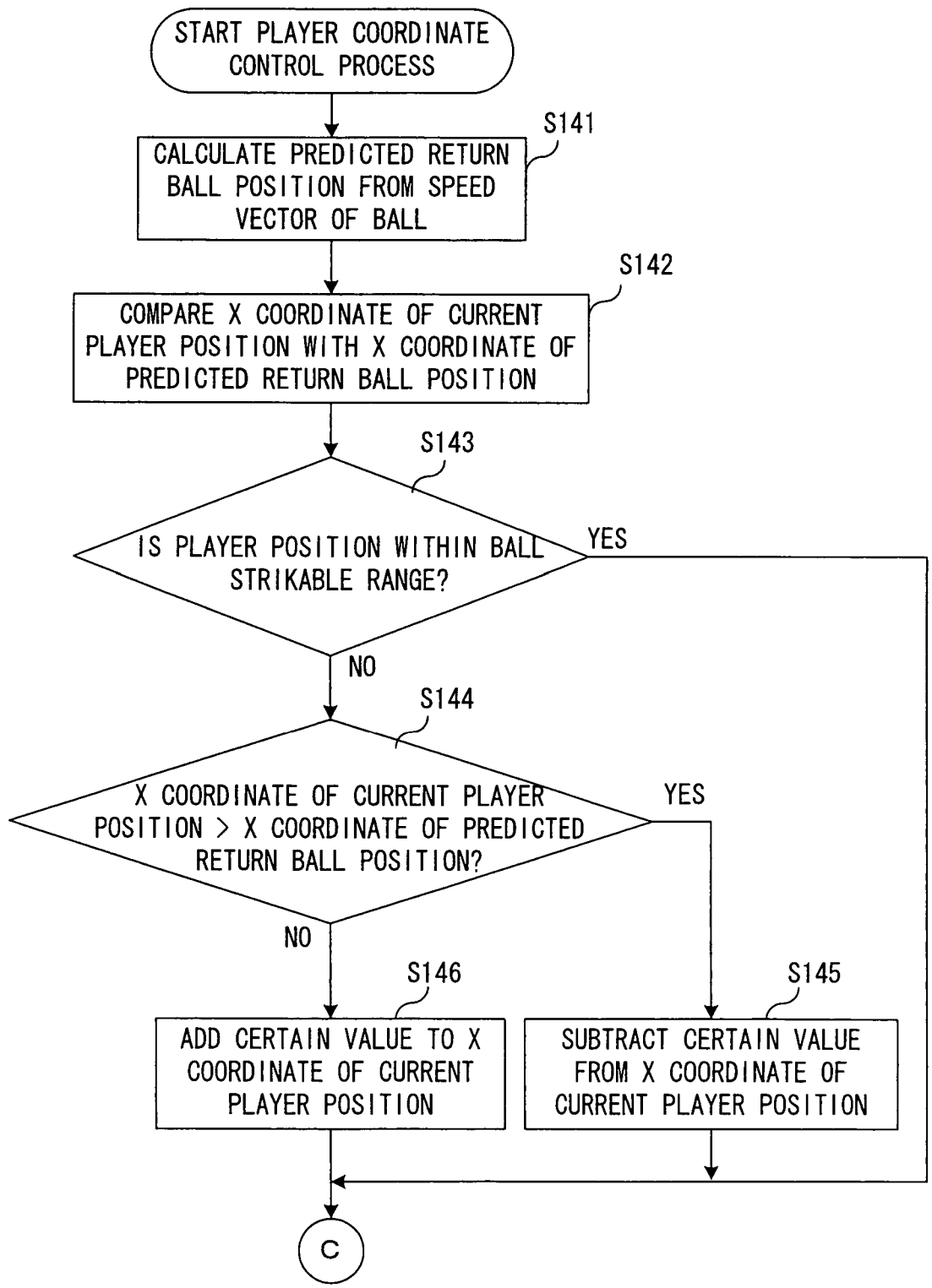
FIG. 19 is a flowchart showing one part of a specific operation of a player coordinate control process by the game processor in FIG. 8 embodiment.

When the ball coordinate control process shown in FIGS. 17 and 18 is completed, the game processor 52 determines whether its state is "during-rally" in a step S92. If YES", the game processor 52 proceeds to the player coordinate control process described in FIGS. 19 and 20. Since the process is the same for both the player 1 and player 2, it is explained below on the assumption that it is applied to the both players. As in the case with the previous process, the player position control process is executed by every single video frame.

Figure 20:
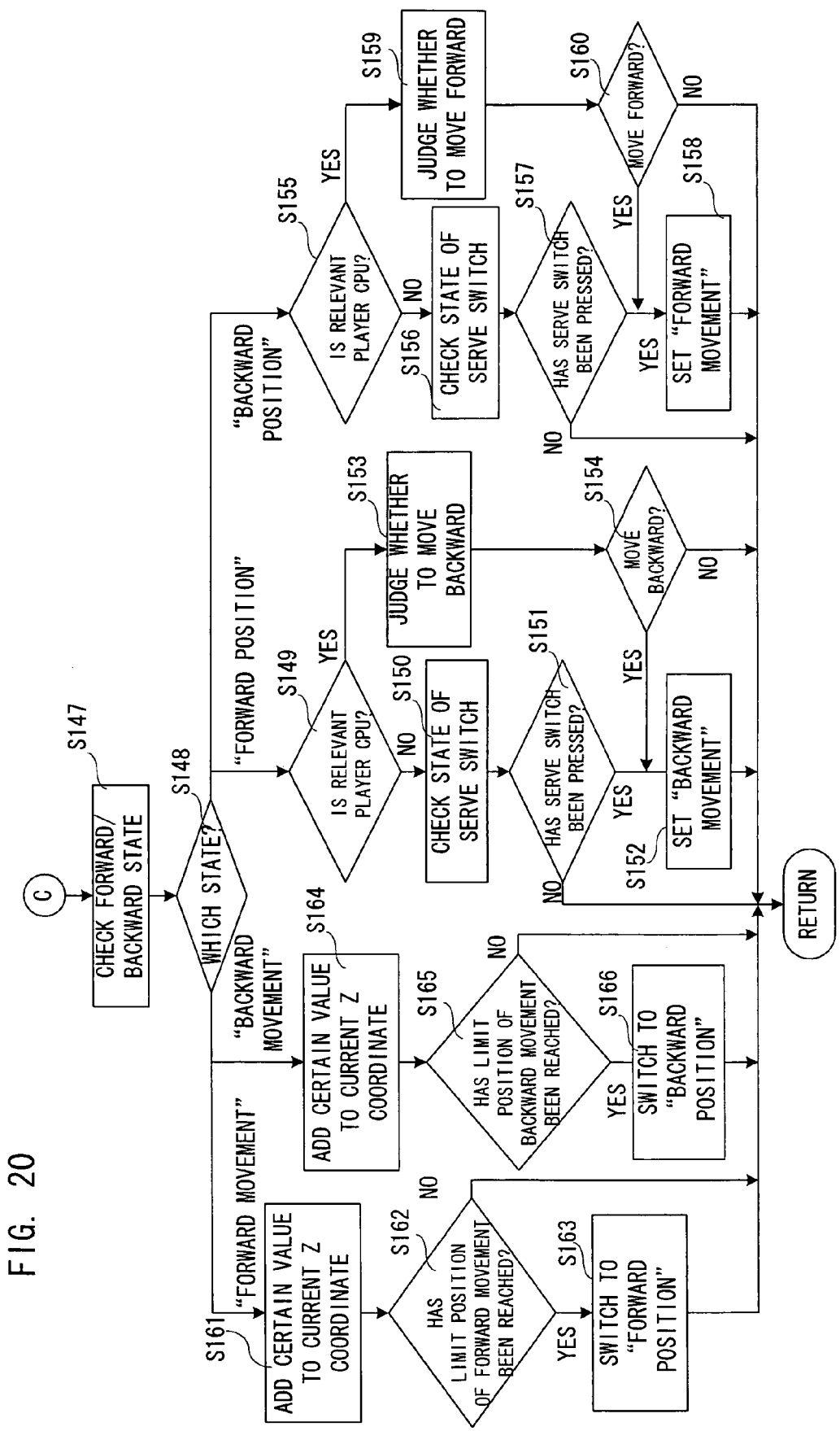
FIG. 20 is a flowchart showing another part of a specific operation of the player coordinate control process.

In a first step S141, the game processor 52 calculates the predicted return position (the predicted position of the ball that will enter the court area on the next ball striking player's side) from the speed vector of the ball. Then, in a step S142, the game processor 52 compares the predicted return position calculated in the step S141 with the current position of the player (X coordinate), and determines whether the predicted return position is within the ball strikable range for the ball striking player. If "YES", this means that the ball striking player can strike the ball without moving or changing its ball striking position, and thus the process proceeds straight to a next step S1147 (FIG. 20).

If the predicted return position is not within the ball strikable range for the ball striking player, the game processor 52 performs an automatic ball striking position control that is a feature of this embodiment. More specifically, the game processor 52 judges whether the current X coordinate of the ball striking player is larger than the X coordinate of the predicted return ball position in a step S144. If "YES" is determined in step S144, this means that the ball striking player is located on the right of the predicted return position on the monitor screen, and that the ball striking position needs to be shifted to the left. In this case, therefore, the game processor 52 subtracts a certain value from the current X coordinate of the ball striking position in a step S145. Reversely, if "NO" is determined in the step S144, this means that the ball striking player is on the left of the predicted return position on the monitor screen, and that the ball striking position needs to be moved to the right. In this case, the game processor 52 adds a certain value to the current X coordinate of the ball striking position. In this way, executing the step S145 or S146 makes it possible to automatically shift the ball striking position of the ball striking player with respect to the predicted return position. After that, the process proceeds to a step S147.

Since "a certain value" in the step S145 or S146 relates to the moving speed of a player, i.e., how fast a player can run, all players may have their own characteristics (running speed) by diversifying the certain value among them.

The above explanation is based on the premise that only the X coordinate is automatically controlled. It is needless to say that the idea of this embodiment can be also easily applied to other coordinates such as Z coordinate if required.

In a step S147 shown in FIG. 20, the game processor 52 checks a "forward/backward" state stored in the memory 54, and judges which is the present state in a step S148. If the present state is "forward position", the game processor 52 proceeds to a step S149 to determine whether the relevant player is the CPU or not. In the case of "NO", the relevant player is the game player, and so the game processor 52 checks the state of the serve switch 38 in a step S150 and determines whether the serve switch 38 has been pressed in a step S151. Specifically, the game processor 52 determines whether the serve switch 38 has been pressed during the rally in the step S151. If "YES", the game processor 52 switches the state of the player in the "forward position" to "backward movement". However, if the result is "YES" in the step S149, i.e. the relevant player is the CPU player, the game processor 52 determines whether the player should move backward or not in steps S153 and S154. If the player needs to move backward, the game processor 52 proceeds to a step S152, and if "NO", the process returns straight. Thus, operating the serve switch 38 during a rally makes it possible to move backward the ball striking player in the forward position, i.e., the ball striking position.

If the state of the player is "backward position", the game processor 52 goes on to a step S155 to determine whether the player is the CPU or not. If "NO", the relevant player is the game player, and so the game processor 52 checks the state of the serve switch 38 in a step S156 and judges whether the serve switch 38 has been pressed in a step S157. Specifically, the game processor 52 determines whether the service switch 38 has been pressed during the rally in the step S157. If "YES", the game processor 52 changes the state of the player in the "backward position" to "forward movement". If "YES" is determined in the step S155, i.e., the relevant player is the CPU player, the game processor 52 determines whether the player should move forward in steps S159 and S160. If the player needs to move forward, the game processor 52 proceeds to a step S158, and if not, the process returns straight. Thus, operating the serve switch 38 during a rally makes it possible to move forward the ball striking player in a backward position, i.e., the ball striking position.

Additionally, if the forward/backward state of a player is set to "forward movement", the game processor 52 adds a certain value to the present Z coordinate to move the player forward in a step S161. Then, when the game processor 52 has determined that the player has reached the limit of forward movement in the Z coordinate in a step S162, it switches the player's state to "forward position" in a step S163. On the other hand, if the forward/backward state of a player is set to "backward movement", the game processor 52 subtracts a certain value from the present Z coordinate to move the player backward in a step S164. Then, when the game processor 52 has determined that the player has reached the limit of backward movement in the Z coordinate in a step S165, it moves the player's state to "backward position". In either case, the process returns.

Figure 21:
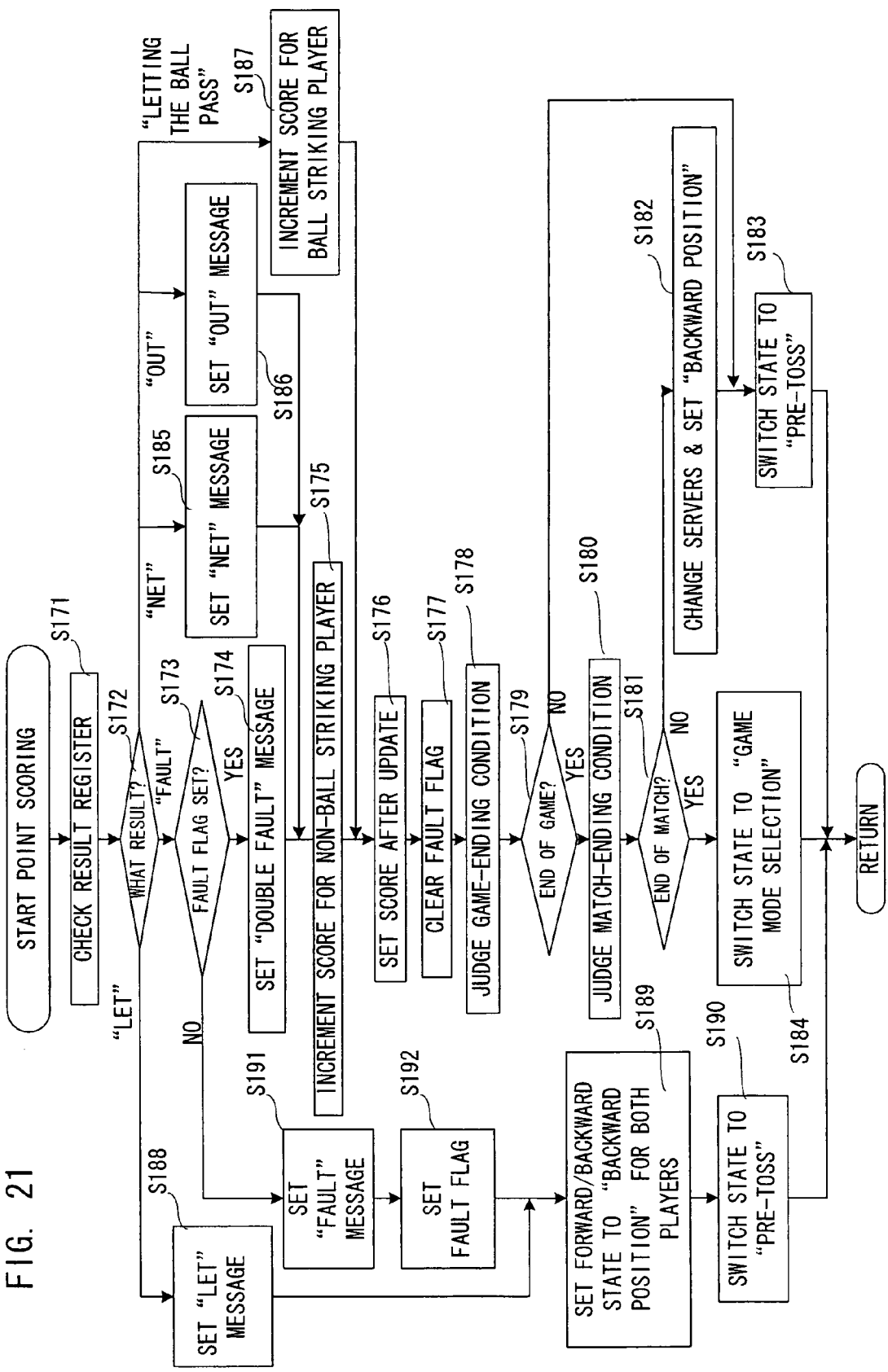
FIG. 21 is a flowchart showing a specific operation of a point scoring process by the game processor in FIG. 8 embodiment.

In addition, an operation of the "point scoring" is performed in accordance with a flowchart shown in FIG. 21. More specifically, the game processor 52 checked the result register in a step S171 and determines the result in a step S172. If the serve result is a "fault", the game processor 52 judges whether a fault flag has been already set, i.e., one fault is recorded in a step S173. If the result is "YES" in the step S173, the game processor 52 sets the message "DOUBLE FAULT" in a step S174 so as to display it on the monitor screen. At the same time, the game processor 52 increments the score of a player not being the ball striking player in a step S175. That is, the game processor 52 adds a point to the score of the non-ball striking player, and displays the increased score in the score display area 48 (FIG. 2 and FIG. 3) in a step S176. After that, the game processor 52 clears the fault flag in the step S177, and judges whether the game has come to an end in steps S178 and S179. If "YES" in a step S179, the game processor 52 judges whether the match has finished in steps S180 and S181. If "YES", the game processor 52 switches its state to "game mode selection" in a step S1184, and returns the process.

If "NO" in the step S181, the game processor 52 changes servers, sets the players to "backward position" in a step S182, and goes on to a step S183 to move its state to "pre-toss", and returns the process. If the judgment result is "NO" regarding the end of the game in the step S179, the process proceeds to the step S183.

If the result stored in the result register is a "net", the game processor 52 sets the message "NET" in a step S185, and moves on to a step S175. Reversely, if the result indicated by the result register is an "out", the game processor 52 sets the message "OUT" in a step S186, and goes on to the step S175. If the result is "letting the ball pass", the game processor 52 increases the score for the ball striking player in a step S187, and proceeds to a step S176.

If the judgment result is a "let" in the step S172, the game processor 52 sets the message "LET" in a step S188, sets the forward/backward state of the both players to "backward position" in a step S189 and moves its state to "pre-toss" in a step S190, and the process returns.

If the serve result is a "fault" and the judgment result in the step S173 is "NO", then that is the first fault, and so the game processor 52 sets the message "FAULT" in a step S191, sets the fault flag in a step S192, and then proceeds to the step S189.

In this manner, the virtual tennis game system 10 in FIG. 1 allows users to play a tennis game on the screen of the monitor 20 by moving or swinging the racket-shaped input device 34 in the three-dimensional space.

In the above-mentioned embodiment, an acceleration correlation signal is taken out as a voltage signal. Alternatively, it may be taken out as a current signal.

Moreover, in the above embodiment, the MCU 50 and LED 36 form a digital signal transmission means so as to send an acceleration correlation digital signal to the processor in a wireless manner. Alternatively, the signal transmission means may send data by means of an appropriate data transmission line instead of doing that wirelessly.

Furthermore, the embodiment shown here as an example, outputs a digital signal as an acceleration correlation signal. Alternatively, it may transmit a detected voltage value or current value as an analog signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system including a game machine and an input device, under which a player plays a game having a rally state using said input device, wherein during the rally state, said input device comprises an acceleration sensor for generating an acceleration correlation signal when said player actually swings said input device in a real space, and a transmission unit for transmitting said generated acceleration correlation signal to said game machine; and said game machine displays a ball on a monitor screen through execution of a game program in which a CPU player character controlled by a computer program plays against a player character controlled by said player, and further comprises:

a first calculation unit for calculating a predicted return position of said ball returned by said CPU player character;

a judgment unit for judging whether a current position of said player character is in a ball strikable range by comparing said predicted return position and the current position of said player character;

a ball striking position movement unit for automatically moving a ball striking position of said player character to be approximated to said predicted return position in which said judgment unit judges that the current position is out of the ball strikable range, wherein the ball striking position of said player character remains at the current position if the current position is within the ball strikable range, and is always moved to be approximated to said predicted return position when the current position is out of the ball strikable range without inactivating said player character to allow said player to continue participating the game;

a swing detection unit for detecting whether said input device has been actually swung or not; and a second calculation unit for calculating an initial speed vector of said ball after received when said swing detection unit has detected a swing in which the position of said ball exists in a ball receivable range that is three-dimensionally defined, from a position of said ball and acceleration of said input device according to said acceleration Correlation signal, wherein the initial speed vector is calculated based on coordinates of said ball on the screen and a magnitude of a swing of said input device.

2. A game system including a game machine and two or more input devices, under which two or more players play a game having a rally state using said input devices, wherein during the rally state, said input devices each comprise an acceleration sensor for generating an acceleration correlation signal when one of said players actually swings said input device in a real space, and a transmission unit for transmitting said generated acceleration correlation signal to said game machine;

said game machine runs a game program in which said two or more players play the game and displays said ball on a monitor screen, and further comprises:

a first calculation unit for calculating a predicted return position of a ball returned by an opposite player character controlled by one of said players;

a judgment unit for judging whether a ball striking player character controlled by another of said players is in a ball strikable range by comparing said predicted return position and a current position of said ball striking player character;

a ball striking position movement unit for automatically moving a ball striking position for said ball striking player character to be approximated to said predicted return position when said judgment unit judges that the current position is out of the ball strikable range, wherein the ball striking position of said ball striking player character remains at the current position if the current position is within the ball strikable range, and is always moved to be approximated to said predicted return position when the current position is out of the ball strikable range without inactivating said ball striking player character to allow said two or more players to continue participating the game;

a swing detection unit for detecting whether said input device has been actually swung or not; and a second calculation unit for calculating an initial speed vector of said ball after received when said swing detection unit has detected a swing in which the position of said ball exists in a ball receivable range that is three-dimensionally defined, from a position of said ball and acceleration of said input device according to said acceleration correlation signal.

3. A game system according to claim 1 or 2, wherein said input device further includes an operating switch;

said transmission unit transmits an operation signal from said operating switch together with said acceleration correlation signal to said game machine; and said game machine further comprises a position movement unit for moving said ball striking position on said monitor screen from forward position to backward position or from backward position to forward position, in response to said operation signal transmitted from said input device.

4. A game system according to claim 1 or 2, wherein said transmission unit of said input device includes an infrared light-emitting element for transmitting said acceleration correlation signal by means of infrared light.

5. A game system according to claim 4, wherein said transmission unit digital-modulates and transmits said acceleration correlation signal to said game machine; and said game machine digital-demodulates said acceleration correlation signal transmitted by said transmission unit.

6. A method for controlling a game having a rally state displayed on a game machine and played by a player using an input device, the gaming machine comprising a processor and the input device, during the rally state, the method comprising:

generating an acceleration correlation signal when said player actually swings said input device in a real space;

transmitting said generated acceleration correlation signal to said game machine;

displaying, by the game machine, a ball on a monitor screen through execution via the processor of a game program in which a CPU player character controlled by a computer program plays against a player character controlled by said player:

calculating, via the processor, a predicted return position of said ball returned by said CPU player character;

judging via the processor, whether a current position of said player character is in a ball strikable range by comparing said predicted return position and the current position of said player character;

automatically moving, via the processor, a ball striking position of said player character to be approximated to said predicted return position in which said judgment unit judges that the current position is out of the ball strikable range, wherein the ball striking position of said player character remains at the current position if the current position is within the ball strikable range, and is always moved to be approximated to said predicted return position when the current position is out of the ball strikable range without inactivating said player character to allow said player to continue participating the game;

detecting, via the processor, whether said input device has been actually swung or not; and calculating, via the processor, an initial speed vector of said ball after received when a swing is detected in which the position of said ball exists in a ball receivable range that is three-dimensionally defined, from a position of said ball and acceleration of said input device according to said acceleration correlation signal, wherein the initial speed vector is calculated based on coordinates of said ball on the screen and a magnitude of a swing of said input device.

7. The method according to claim 6, wherein said input device includes an operating switch and a transmitting unit, the transmitting unit transmits an operation signal from said operating switch together with said acceleration correlation signal to said game machine, and wherein the method further comprises moving, via the processor, said ball striking position on said monitor screen from forward position to backward position or from backward position to forward position, in response to said operation signal transmitted from said input device.

8. The method according to claim 6, wherein said input device includes transmitting unit having an infrared light-emitting element for transmitting said acceleration correlation signal by means of infrared light.

9. The method according to claim 8, wherein said transmission unit digital-modulates and transmits said acceleration correlation signal to said game machine; and said game machine digital-demodulates said acceleration correlation signal transmitted by said transmission unit.

10. A method for controlling a game having a rally state displayed on a game machine played by two or more players using two or more input devices, the game machine comprising a processor and the two or more input devices, during the rally state, the method comprising:

generating acceleration correlation signals when the two or more players actually swing said two or more input devices in a real space;

transmitting said generated acceleration correlation signals to said game machine, wherein said game machine runs a game program in which said two or more players play the game and displays a ball on a monitor screen;

calculating, via the processor, a predicted return position of a ball returned by an opposite player character controlled by one of said players;

judging, via the processor, whether a ball striking player character controlled by another of said players is in a ball strikable range by comparing said predicted return position and a current position of said ball striking player character;

automatically moving, via the processor, a ball striking position for said ball striking player character to be approximated to said predicted return position when said judgment unit judges that the current position is out of the ball strikable range, wherein the ball striking position of said ball striking player character remains at the current position if the current position is within the ball strikable range, and is always moved to be approximated to said predicted return position when the current position is out of the ball strikable range without inactivating said ball striking player character to allow said two or more players to continue participating the game;

detecting, via the processor, whether said two or more input devices have been actually swung or not; and calculating, via the processor, an initial speed vector of said ball after received When a swing is detected in which the position of said ball exists in a ball receivable range that is three-dimensionally defined, from a position of said ball and acceleration of said input device according to said acceleration correlation signal.

11. The method according to claim 10, wherein each of said input devices includes an operating switch and a transmission unit; said transmitting unit transmits an operation signal from said operating switch together with said acceleration correlation signal to said game machine, and wherein the method further comprises a position movement unit for moving said ball striking position on said monitor screen from forward position to backward position or from backward position to forward position, in response to said operation signal transmitted from said input device.

12. The method according to claim 10, wherein each of said input devices includes a transmission unit having an infrared light-emitting element for transmitting said acceleration correlation signal by means of infrared light.

13. The method according to claim 12, wherein said transmission unit digital-modulates and transmits said acceleration correlation signal to said game machine; and said game machine digital-demodulates, via the processor, said acceleration correlation signal transmitted by said transmission unit.

* * * * *